(12) United States Patent
Kumar

(10) Patent No.: US 12,400,003 B2
(45) Date of Patent: *Aug. 26, 2025

(54) SECURITY TOOL INTEGRATED INTO BUILD PLATFORM TO IDENTIFY VULNERABILITIES

(71) Applicant: SafeOps LLC, Jersey City, NJ (US)

(72) Inventor: Sunil Kumar, Jersey City, NJ (US)

(73) Assignee: SafeOps LLC, Jersey City, NJ (US)

( * ) Notice: Subject to any disclaimer, the term of this patent is extended or adjusted under 35 U.S.C. 154(b) by 190 days.

This patent is subject to a terminal disclaimer.

(21) Appl. No.: 17/994,954

(22) Filed: Nov. 28, 2022

(65) Prior Publication Data

US 2023/0161882 A1    May 25, 2023

Related U.S. Application Data

(63) Continuation-in-part of application No. 17/385,016, filed on Jul. 26, 2021.

(51) Int. Cl.
G06F 21/57    (2013.01)
G06F 11/3668  (2025.01)
G06F 21/55    (2013.01)

(52) U.S. Cl.
CPC ........ G06F 21/577 (2013.01); G06F 11/3688 (2013.01); G06F 21/554 (2013.01); *G06F 2221/033* (2013.01)

(58) Field of Classification Search
CPC .................. G06F 21/577; G06F 2221/033
See application file for complete search history.

(56) References Cited

U.S. PATENT DOCUMENTS

| | | |
|---|---|---|
| 11,252,172 B1 | 2/2022 | Valiensi et al. |
| 2003/0163799 A1 | 8/2003 | Vasilik et al. |
| 2006/0101517 A1 | 5/2006 | Banzhof et al. |
| 2007/0192861 A1 | 8/2007 | Varghese et al. |
| 2015/0058680 A1 | 2/2015 | Kortti et al. |
| 2015/0302198 A1* | 10/2015 | Payne ............... G06F 21/562 726/23 |
| 2017/0090884 A1 | 3/2017 | Cawley |
| 2017/0264632 A1 | 9/2017 | Pickles |
| 2018/0052762 A1 | 2/2018 | Vyas et al. |
| 2018/0081784 A1 | 3/2018 | Rivera et al. |
| 2019/0205542 A1* | 7/2019 | Kao ..................... G06F 8/10 |
| 2019/0318366 A1* | 10/2019 | Carranza ............. G06N 3/08 |
| 2020/0128016 A1* | 4/2020 | Blass ................. H04L 63/101 |

(Continued)

OTHER PUBLICATIONS

Van Rensburg et al. Vulnerability Testing in the Development Cycle IST-Africa 2017 Conference Proceedings ISBN: 978-1-905824-57-1 (Year: 2017).

*Primary Examiner* — David J Pearson
(74) *Attorney, Agent, or Firm* — Workman Nydegger

(57) ABSTRACT

Techniques for dynamically controlling whether a code build of an application finishes to completion or is terminated prior to completion are disclosed. An application is determined to be entering a development state in which a code build of the application is to occur. After the code build for the application has started, the code build is prevented from completing by a scanning tool. While the code build is being prevented from completing, the scanning tool performs a scan of the application. Based on a result of the scan, the code build is terminated prior to completion.

20 Claims, 22 Drawing Sheets

(56) References Cited

U.S. PATENT DOCUMENTS

| | | | |
|---|---|---|---|
| 2020/0175172 A1* | 6/2020 | Parsons | G06F 21/577 |
| 2020/0244695 A1 | 7/2020 | Veselov et al. | |
| 2020/0264866 A1 | 8/2020 | Collins et al. | |
| 2020/0272743 A1* | 8/2020 | Song | H04L 63/1433 |
| 2021/0042217 A1* | 2/2021 | Hwang | G06F 11/3604 |
| 2021/0133091 A1* | 5/2021 | Pillai | G06F 11/3604 |
| 2021/0152520 A1* | 5/2021 | Rigor | H04L 63/0245 |
| 2021/0248058 A1 | 8/2021 | Hattingh | |
| 2022/0215100 A1 | 7/2022 | Waplington | |
| 2022/0253297 A1* | 8/2022 | Wallis | G06F 8/65 |
| 2022/0283801 A1* | 9/2022 | Hoenzsch | G06F 8/60 |

\* cited by examiner

| Home | ① New Service | ② Connect Source Code | ③ Cloud Provider | ④ Configure | ⑤ Review | ⑥ Security Practices |
|---|---|---|---|---|---|---|
| Vulnerabilities Details | | | | | | |
| Managed Services | Cloud Provider: Access      Cloud Details — 1200 | | | | | |
| Scans | SafeOps will require access to your account for threat monitoring, follow these steps to allow access for SafeOps | | | | | |
| Compliance Center | | | | | | |
| Red Teaming | 1. Sign in and open the AWS IAM Console<br>   Create New Role<br>2. Enter the following values:<br>   >Account ID: xxxxx<br>   >Require external ID is checked<br>   > External ID: xxxxx | | | | | |
| Settings | | | | | | |

*Figure 12*

| Home | ① New Service | ② Connect Source Code | ③ Cloud Provider | ④ Configure | ⑤ Review | ⑥ Security Practices |
|---|---|---|---|---|---|---|
| Vulnerabilities Details | | | | | | |
| Managed Services | Cloud Provider      Cloud Details — 1300 | | | | | |
| Scans | Please select your cloud provider for threat monitoring | | | | | |
| Compliance Center | | | | | | |
| Red Teaming |      AWS       Google Cloud | | | | | |
| Settings |     Azure        vmware | | | | | |
| | Back            Skip    Next | | | | | |

*Figure 13*

| | ① | ② | ③ | ④ | ⑤ | ⑥ |
|---|---|---|---|---|---|---|
| Home | New Service | Connect Source Code | Cloud Provider | Configure | Review | Security Practices |

Sidebar: Home, Vulnerabilities Details, Managed Services, Scans, Compliance Center, Red Teaming, Settings Dashboard — 1600

Apps Dashboard

Connect and configure applications for security monitoring

| URL | Username | Password | Envir. | Repo. | Image |
|---|---|---|---|---|---|
| | | | | | |

Back    + New    Next

*Figure 16*

Security — 1700

Security Practices

One last step! Do you implement any of the following security practices?

| Web Application Firewall | Intrusion Detection System |
|---|---|

Back    Next

*Figure 17*

Red Team
2200

| | | |
|---|---|---|
| Home | Red Teaming | Solution |
| Vulnerabilities Details | Issue Id | |
| Managed Services | | |
| Scans | | |
| Compliance Center | | |
| Red Teaming | | |
| Settings | | |

New Entry

Critical ID

Title

Evidence ☐
Severity ☐
Solution ☐

Submit

*Figure 22*

Settings
2300

| | |
|---|---|
| Home | General Settings |
| Vulnerabilities Details | Notifications |
| Managed Services | Slack — Connect |
| Scans | PagerDuty — Connect |
| Compliance Center | Email — Connect |
| Red Teaming | CI/CD Integration |
| Settings | Security Threshold ⊢————●——⊣ 80 |
| | Max Critical Issues  5 |

*Figure 23*

|   |   |
|---|---|
| Home | ① ② ③ ④ ⑤ ⑥ |
| Vulnerabilities Details | New Connect Cloud Configure Review Security |
| Managed Services | Service Source Code Provider Practices |
| Scans | Configuration |
| Compliance Center | Image Registry: Access ⸺ 2415 |
| Red Teaming | SafeOps requires your registry credentials to access your images |
| Settings | Host URL ARN Role |
|   | [        ]   [        ] |
|   |   |
|   | [Back]                                    [Next] |

*Figure 24C*

|   |   |
|---|---|
| Home | ① ② ③ ④ ⑤ ⑥ |
| Vulnerabilities Details | New Connect Cloud Configure Review Security |
| Managed Services | Service Source Code Provider Practices |
| Scans | Configuration |
| Compliance Center | How do you store your app images? ⸺ 2420 |
| Red Teaming |   |
| Settings | [DockerHub] [Elastic Container Registry] [Azure Container Registry] [Google Cloud Container Registry] |
|   |   |
|   | [Back]                         [Skip]  [Next] |

*Figure 24D*

Recommendation Engine 2900

| Category | Impact | Total Issues | Recommendation |
|---|---|---|---|
| Cloud Trail | 24% | 164 | xxx |
| S3 | 14% | 98 | xxx |
| Iam | 12% | 80 | xxx |
| Cloud Trail | 24% | 16 | xxx |

Cloud Recommendations

Sidebar: Home, Vulnerabilities Details, Managed Services, Scans, Compliance Center, Red Teaming, Settings

SECURITY TOOL INTEGRATED INTO BUILD PLATFORM TO IDENTIFY VULNERABILITIES

CROSS-REFERENCE TO RELATED APPLICATIONS

This application is a continuation-in-part of U.S. patent application Ser. No. 17/385,016 filed on Jul. 26, 2021, entitled "Security Tool Integrated Into Build Platform To Identify Vulnerabilities," which application is expressly incorporated herein by reference in its entirety.

BACKGROUND

Software development (e.g., software development 100 of FIG. 1) generally refers to the process of designing, programming, debugging, and deploying an application, framework, or other computing construct. Generally, such development follows a process, such as the development pipeline 200 of FIG. 2. For instance, the development pipeline 200 generally includes a development 205 state in which code is conceived and created by developers. That code is often then committed (e.g., commit 210) or checked in to a central repository. The checked-in code is then subjected to a code build process (e.g., build 215) in which executable code is compiled. The executable application is then tested (e.g., test 220), deployed (e.g., deploy 225), and staged (e.g., stage 230). The application is then used in production 235.

Throughout these different stages, any number of problems can occur. For example, such problems can include security issues. For instance, a bug in the code might unintentionally cause a network port to be opened in the computer when the application is used, thereby potentially exposing the computer to security vulnerabilities. To detect such vulnerabilities, developers often perform a so-called "penetration test" or "pen test" of the application. A penetration test (aka scan) exercises the application in various ways in an attempt to find bugs, errors, security issues, or other aspects of application that could be exploited. Traditionally, penetration testing was performed on a scheduled basis, such as perhaps every month or every quarter.

Interestingly, however, new "roll outs" or "updates" of an application can happen on an almost daily basis. Sometimes, updates can occur multiple times a day. With these updates, there is a potential that new security vulnerabilities will be introduced into the application. If traditional penetration testing techniques were followed, then these security vulnerabilities might be left unchecked for a prolonged period of time, thereby potentially leaving the application and underlying computer subject to exploitation by malicious actors. What is needed, therefore, is an improved methodology for exercising applications to better detect vulnerabilities.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for dynamically controlling whether a code build of an application finishes to completion or is terminated prior to completion.

Some embodiments install (e.g., as a plugin component) a scanning tool into a software development architecture. There is then a determination that an application, which is being hosted in the software development architecture, is entering a development state in which a code build of the application is to occur. After the code build for the application has started, the embodiments prevent the code build from completing. Furthermore, while the code build is being prevented from completing, the embodiments cause the scanning tool to perform a penetrative test of the application. Based on a result of the penetrative test, the code build is either permitted to complete or, alternatively, the code build is terminated prior to completion. The embodiments also generate an alert that includes the result of the penetrative test.

Some embodiments identify that a scanning tool is operating as a plugin component in a software development architecture. The embodiments also determine that an application, which is being hosted in the software development architecture, is entering a development state where a code build of the application executes to generate executable code for the application. After the code build for the application has started, the embodiments prevent the code build from completing generation of the executable code for the application at least until after a penetrative test of the application is performed by the scanning tool. While the code build is being prevented from completing the generation of the executable code for the application, the embodiments cause the scanning tool to perform the penetrative test of the application. Based on a result of the penetrative test, the embodiments either permit the code build to complete the generation of the executable code or, alternatively, terminate the code build prior to completing the generation of the executable code.

Some embodiments determine that an application, which is being hosted in a software development architecture, is entering a development state in which a code build of the application is to occur. After the code build for the application has started, a scanning tool, which is installed as a plugin component in the software development architecture, is used to prevent the code build from finishing a set of build tasks. While the code build is being prevented from finishing the set of build tasks, the scanning tool performs a penetrative test of the application. Based on a result of the penetrative test, the embodiments terminate the code build prior to the set of build tasks finishing. Notably, the result of the penetrative test indicates that the scanning tool has identified at least a threshold number of vulnerabilities for the application.

Some embodiments determine potential security threats related to a system by using a scanning tool. Each security threat is aggregated into a recommendation engine. The recommendation engine is displayed in a user interface and includes a set of recommendations.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 12 illustrates an example user interface showing an option for connecting to a cloud.

FIG. 13 illustrates an example user interface showing various options for connecting to the cloud.

FIG. 16 illustrates an example dashboard that displays various information about an application.

FIG. 17 illustrates an example dashboard for displaying security practices.

FIG. 22 illustrates an example user interface having a so-called "Red Team" option in which vulnerabilities can be further analyzed.

FIG. 23 illustrates an example user interface having an option for adjusting a security threshold.

FIG. 24C shows an example user interface for configuring an image registry.

FIG. 24D shows another example interface for configuring application images.

DETAILED DESCRIPTION

Figure 1:
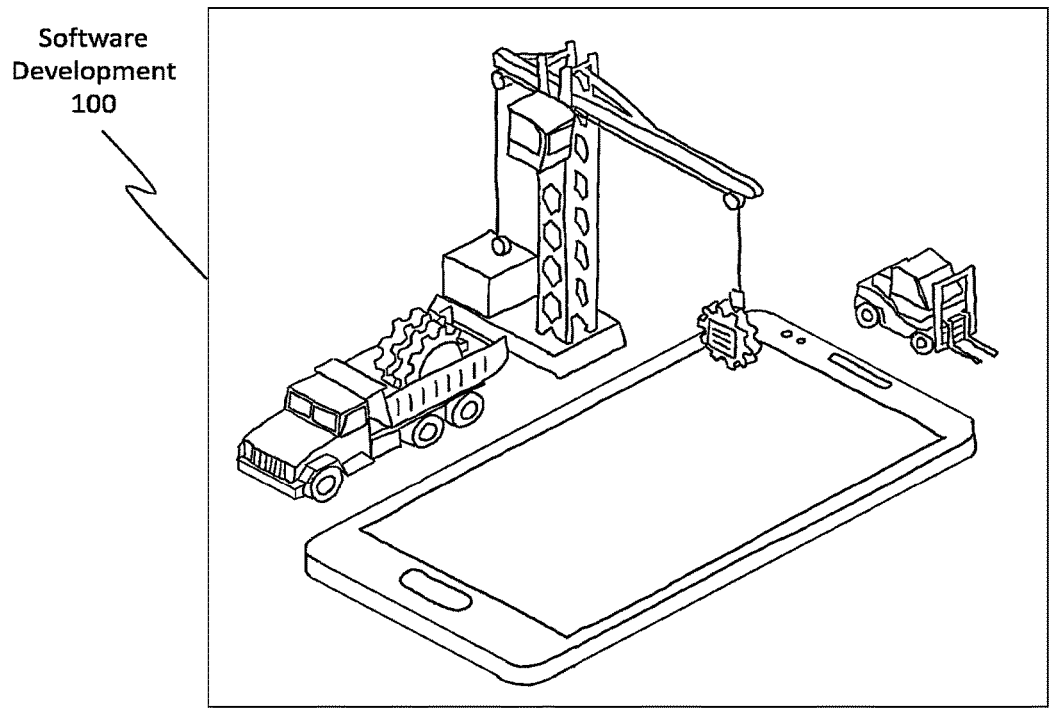
FIG. 1 illustrates an example of software development.
Figure 2:
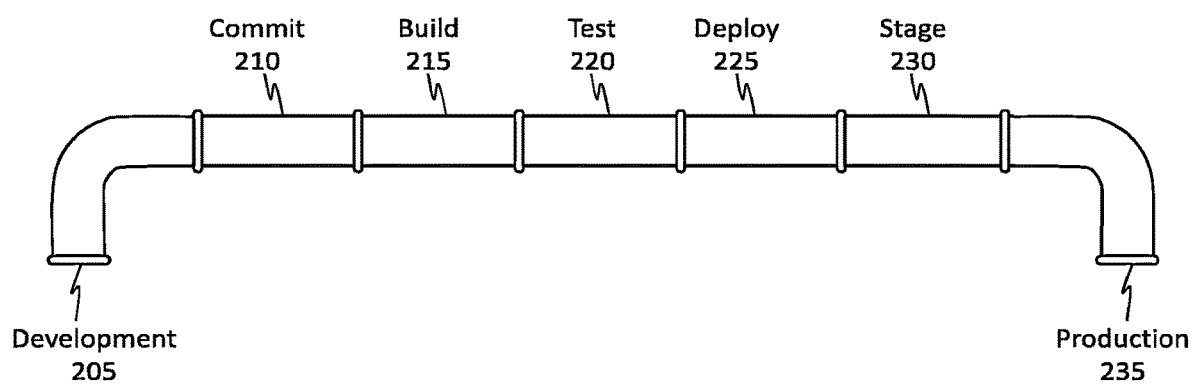
FIG. 2 illustrates a number of stages or steps that can be included in a development pipeline.

Embodiments disclosed herein relate to systems, devices (e.g., hardware storage devices, wearable devices, etc.), and methods for dynamically controlling whether a code build of an application finishes to completion or is terminated prior to completion.

Some embodiments install (e.g., as a plugin component) a scanning tool into a software development architecture. A determination is then made that an application is to be built. After the code build for the application has started, the scanning tool can prevent the code build from completing. The scanning tool then performs a penetrative test of the application. Based on a result of the penetrative test, the scanning tool either permits the code build to complete or, alternatively, the scanning tool terminates the code build prior to completion. The scanning tool can also generate an alert.

In some embodiments, a scanning tool operates as a plugin component in a software development architecture. An application is determined to be entering a development state where a code build of the application generates executable code for the application. After the code build has started, the code build is prevented from completing generation of the executable code at least until after a penetrative test of the application is performed by the scanning tool. The scanning tool performs the penetrative test of the application. Based on a result of the penetrative test, the code build is either permitted to complete the generation of the executable code or, alternatively, is terminated prior to completing the generation of the executable code.

In some embodiments, an application enters a development state in which a code build of the application is to occur. After the code build for the application has started, a scanning tool is used to prevent the code build from finishing a set of build tasks. While the code build is being prevented from finishing the set of build tasks, the scanning tool performs a penetrative test of the application. Based on a result of the penetrative test, the embodiments terminate the code build prior to the set of build tasks finishing. Notably, the result of the penetrative test indicates that the scanning tool has identified at least a threshold number of vulnerabilities for the application.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about significant, real, and practical improvements to the technical field. By way of example and not limitation, the embodiments are able to perform a penetrative test on an application to identify vulnerabilities that an application might have. Beneficially, this penetrative test is performed during a code build operation of the application. That is, the embodiments introduce a scanning tool into the software development flow, and that tool can be configured to interrupt the software development flow in a strategic manner. In today's age, new rollouts and updates can occur even multiple times a day. For each update, a new code build occurs. By causing the penetrative test to occur during the code build process, the embodiments beneficially are able to delay the code build in order to check the application for vulnerabilities. If a threshold number or type of vulnerabilities are detected during the time while the code build is happening, then the embodiments are able to terminate the code build before it completes. By doing so, the new rollout or update will be prevented from being pushed out to client devices, thereby ensuring that a compromised application is not released into the public. That is, because this new update was determined to be highly vulnerable, the embodiments beneficially prevent that update from being pushed out, thereby protecting client devices (and the application) from such vulnerabilities.

In this sense, the disclosed embodiments significantly improve computer security. Furthermore, the act of preventing updates from being dispersed is a real benefit because those updates were determined to be highly susceptible. The embodiments also improve the technical field by providing an intuitive set of user interfaces that are designed to help users understand which vulnerabilities are critical and warrant review right away. Through use of the disclosed user interfaces, the user's interaction with a computer system is also significantly improved.

The embodiments also improve the technical field by providing the ability to sift through different "noisy" security issues. For instance, it may be the case that an application has a large number of vulnerabilities, some of which are more critical than others. The disclosed embodiments are able to collect and analyze the information related to these vulnerabilities and then ranked those vulnerabilities. The embodiments can then present a ranked list and facilitate the triage of the most critical vulnerabilities. Therefore, although one of the biggest problems in the industry is sorting through signal and noise in terms of security issues, the embodiments improve this process by providing a ranked list to users, where the issues raised in that ranked list can be normalized in order to determine their respective severities.

The embodiments improve the technical field by allowing the scanning tool to run in a passive mode. By running in a passive mode post integration, embodiments reduce and/or eliminate interfering with network traffic. In the case of slow attacks, the slow attack slowly drains the system. By passively running the disclosed embodiments, detecting the attack does not further drain the system.

The disclosed embodiments also improve workflow by providing the ability to delegate tasks. For example, when a recommended security action is selected, the disclosed embodiments can automatically assign the task to the appropriate team and/or team members. When the task is completed, the embodiments can automatically update the recommendation list to provide real time recommendations based on the current status of the system. Some embodiments provide a secure system to automatically implement the recommendations reducing the time required to resolve the detected issues.

Additionally, as will be discussed in more detail later, the embodiments can discern or determine whether an application is compliant with any number of defined regulations. The embodiments can also detect when executing applications are subject to fast brute force attacks and/or low and slow attacks. By performing the disclosed operations, the embodiments identify security problems before an application is deployed to the public. In effect, the embodiments build in a "hacker" mentality into the software development pipeline, where such a mentality significantly improves the safety of an application. It is axiomatic that resolving problems earlier on in the development process is orders of magnitude easier than resolving problems later on in the development process. By conducting a penetrative test prior to the release of a built application, vulnerabilities can be detected early on in the process and thus can also be resolved earlier. Accordingly, these and numerous other benefits will now be described in more detail throughout the remaining portion of this disclosure.

Software Development Architecture

Figure 3:
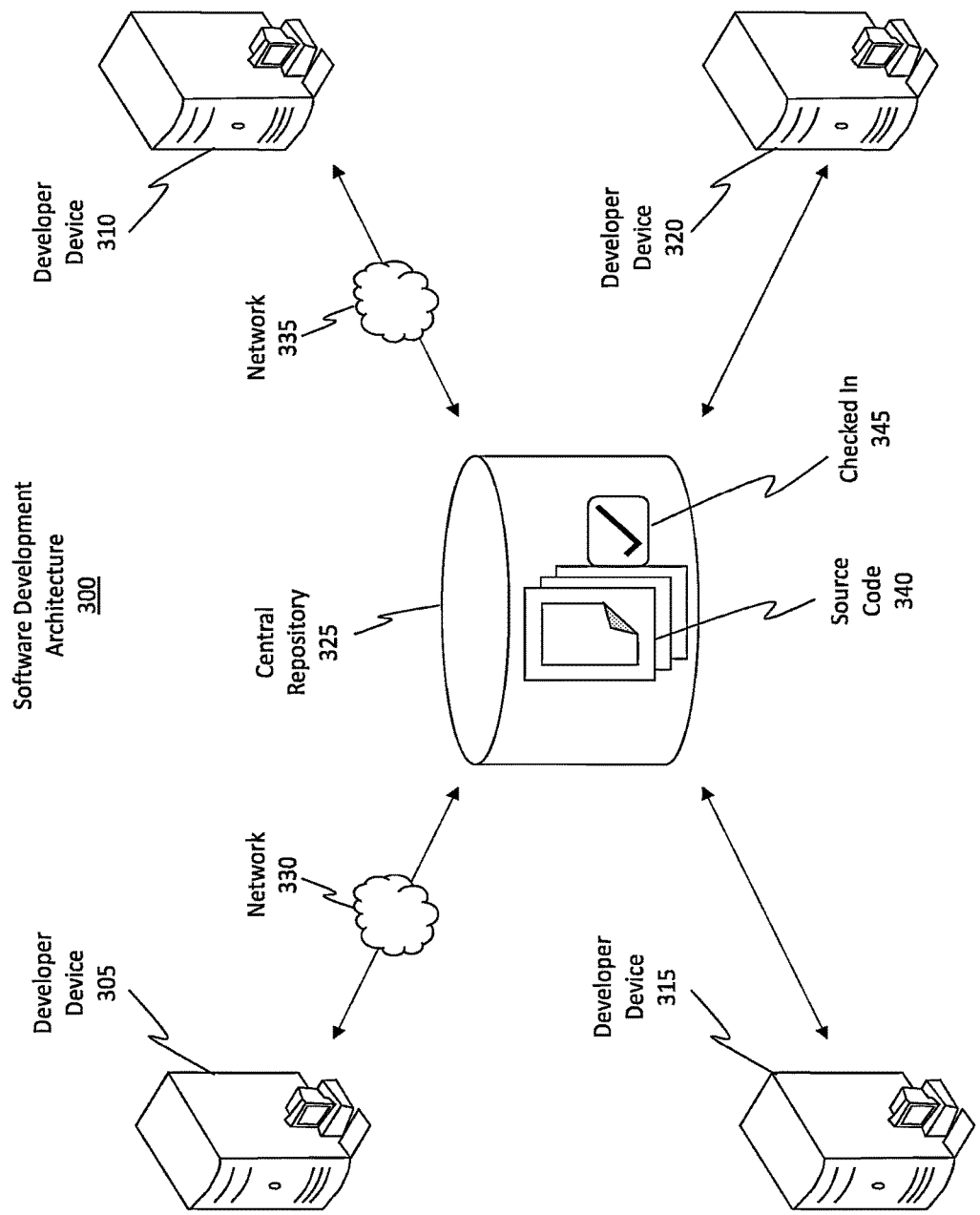
FIG. 3 illustrates an example software development environment.

Attention will now be directed to FIG. 3, which illustrates a software development architecture 300 in which a number of developers are actively working on developing code for an application. In this scenario, there are four different developers working on four different devices, as shown by developer device 305, developer device 310, developer device 315, and developer device 320. Each developer at his/her respective developer device is working on code to program an application. The code and supporting files can be "checked in" to a central repository 325 in order to maintain version control and in order to have the code stored and protected in a central location.

Here, the developer device 305 is communicating with the central repository 325 via a network 330, such as perhaps the Internet or some other network. Similarly, the developer device 310 is communicating with the central repository 325 via the network 335. In contrast, the developer device 315 and the developer device 320 can have a direct linkage, such as perhaps via a local area network (LAN) with the central repository. Regardless of how the various devices connect and communicate with the central repository 325, those devices are able to store source code 340 and other files (e.g., libraries, supporting files, executables, etc.) in the central repository 325. That is, the various files can be checked in 345 and maintained at the central repository 325. This architecture safeguards the various files (e.g., the source code 340, libraries, dependencies, supporting files, etc.) from potential loss or even from misuse.

Scanning Tool that can Prevent Build Completion

Figure 4:
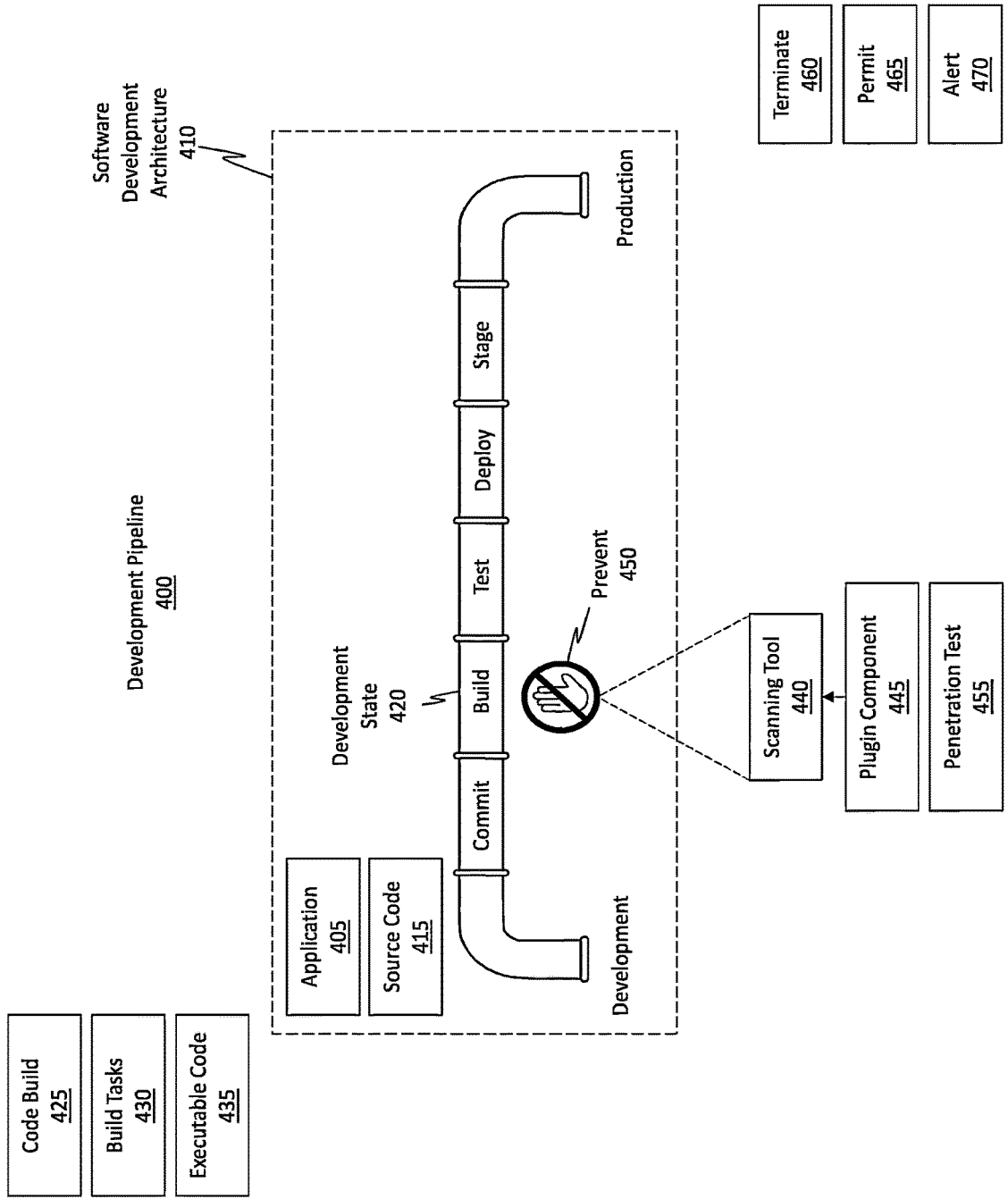
FIG. 4 illustrates how a new scanning tool can be introduced into the development pipeline flow, where this new scanning tool is configured to dynamically control whether a code build process (i.e. a stage in the development pipeline) is permitted to finish to completion or prematurely end.

FIG. 4 shows a development pipeline 400, which is somewhat similar to the development pipeline 200 of FIG.

2. For instance, the development pipeline 400 includes various stages that can be followed when developing an application 405 in a software development architecture 410, which can optionally include the software development architecture 300 of FIG. 3 and/or platforms such as an integrated development environment (IDE), a cloud development platform (e.g., IaaS, PaaS, and/or SaaS), or any other platform. The source code 415 of the application 405 can be developed by generally following the development states or stages outlined in FIG. 4 (e.g., commit, build, test, etc.).

One of the stages or states in the development pipeline 400 is particularly emphasized and is labeled as development state 420. This development state 420 refers to a code build 425 process in which the source code 415 is compiled, and executable code is generated for the application 405. Generally, the code build 425 process involves a set of tasks (e.g., as shown by build tasks 430) that operate to create the executable code 435 for the application 405. As an example, the set of tasks can include fetching the source code from a central repository (e.g., central repository 325 of FIG. 3); compiling the high-level source code into object code or machine language that is executable by a computer system; linking libraries and other files; and even archiving build logs. Of course, the set of build tasks 430 can include other operations as well.

In accordance with the disclosed principles, the embodiments are able to inject or install a scanning tool 440 into the software development architecture 410 as a plug in component 445. This scanning tool 440 is triggered at least when the build development state 420 is activated, and the scanning tool 440 performs a penetration test 455 and other monitoring operations on the application 405 and optionally even the software development architecture 410 (e.g., perhaps the cloud structure, IaaS structure, PaaS structure, SaaS structure), and/or any other corresponding infrastructure. Additionally, and very beneficially, the scanning tool 440 actively prevents (e.g., as shown by prevent 450) the code build 425 from finishing to completion until the penetration test 455 is completed and optionally until results of the penetration test 455 are reviewed and analyzed. As will be discussed in more detail later, if the results of the penetration test 455 indicate that the application 405 has serious vulnerabilities (or a threshold number of vulnerabilities), then the scanning tool 440 will terminate 460 the code build 425 prior to completion such that the executable code 435 is not generated and such that the roll out or deployment of the application 405 is prevented from happening. One option for terminating the code build 425 is to throw an error into the code build 425 process. Another option is to simply terminate any tasks or routines associated with the code build 425, thereby ending the entire process.

On the other hand, if the results of the penetration test 455 indicate that the application 405 does not have serious vulnerabilities (or does not have at least a threshold number of vulnerabilities, as will be discussed in more detail later), then the scanning tool 440 will permit 465 the code build 425 to finish to completion. The scanning tool 440 can also generate an alert 470 that lists or reflects the results of the penetration test 455.

Penetration Testing

Figure 5:
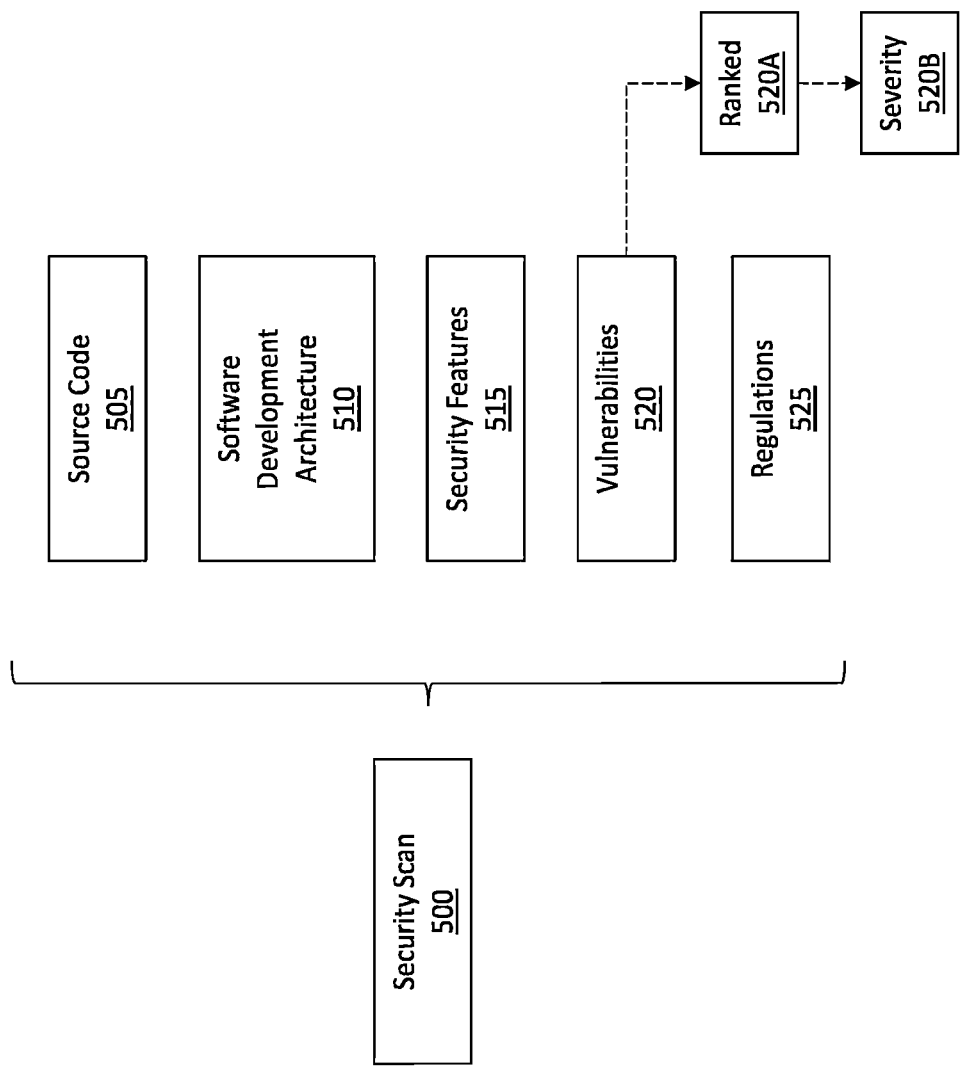
FIG. 5 illustrates various areas where a penetrative test can probe as well as various issues that can be reviewed as a result of performing the penetrative test.

A penetration test is also often referred to as a "pen test." This test is designed to simulate or mimic a cyber-attack against the application in an effort to identify and exploit vulnerabilities. FIG. 5 shows some additional details of a penetration test, which is reflective of the penetration test 455 of FIG. 4 and which can be included as a part of a security scan 500 (i.e. the security scan 500 includes any type of penetration test). Generally, the security scan 500 can exercise or test source code 505 of an application, the software development architecture 510 of the application (e.g., including the cloud infrastructure, such as the IaaS, PaaS, or SaaS environment of the application), port scanning, OS identification, route tracing, password and username cracking, design errors, configuration errors, software bugs, and so on.

The security scan 500 can also be used to perform a vulnerability assessment to identify security features 515 that are subject to attack or might be compromised as well as other vulnerabilities 520. In some cases, the vulnerabilities 520 can be ranked 520A based on priority and/or severity 520B. The security scan 500 can also determine whether the application, including its constituent parts, follows predefined regulations 525. Again, further details on all of these features will be provided later.

Scanning Tool

Figure 6:
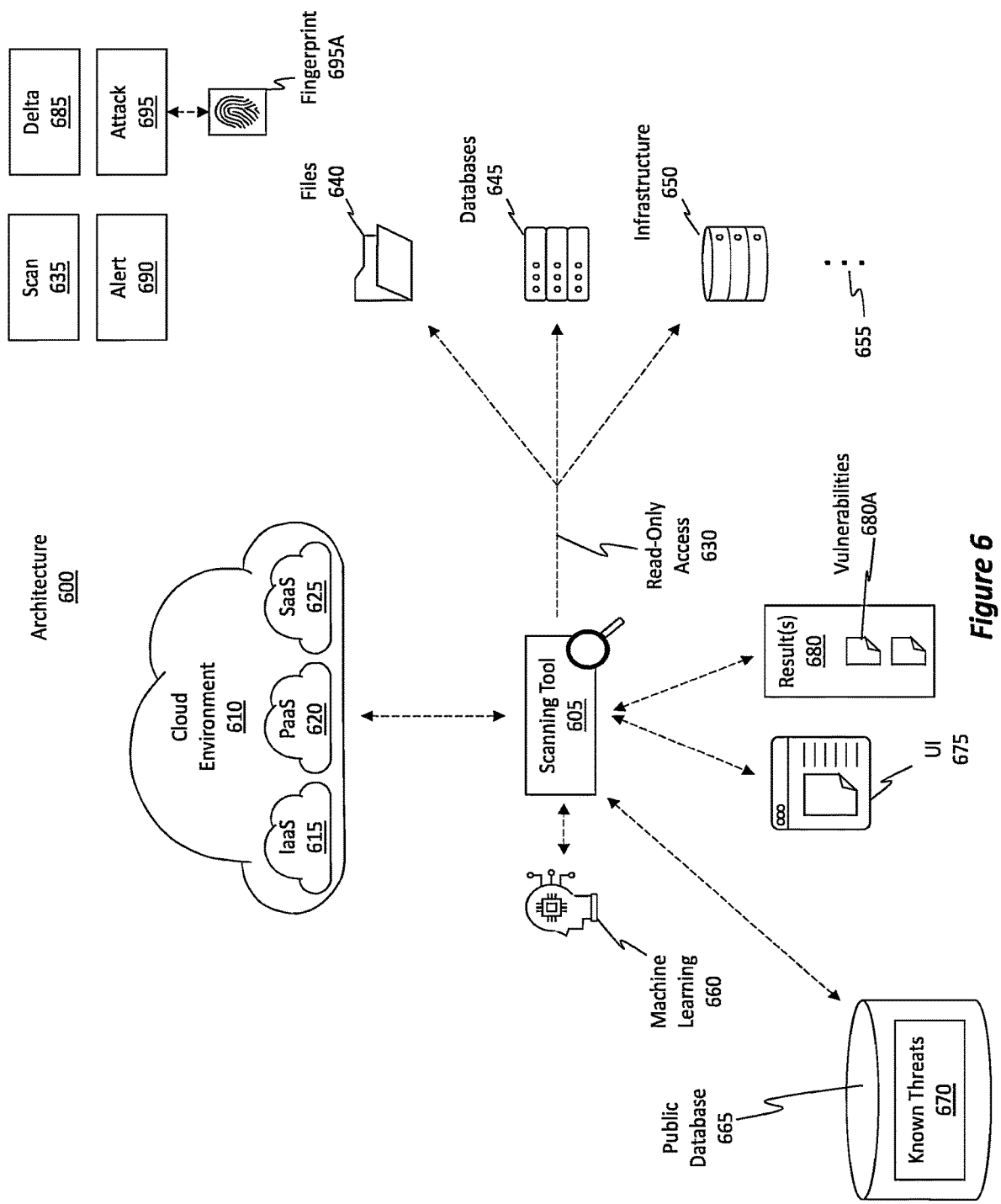
FIG. 6 illustrates an example architecture in which the scanning tool is used to reveal vulnerabilities.

FIG. 6 shows an example architecture 600 in which a scanning tool 605, which is representative of the scanning tool 440 in FIG. 4, is configured to scan an application and associated components or infrastructures to detect vulnerabilities associated with that application. In particular, the scanning tool 605 can be a plugin component installed in a cloud environment 610. The scanning tool 605 can be used in any type of IaaS 615 environment, PaaS 620 environment, or SaaS 625 environment. Not only can the scanning tool 605 analyze an application, but it can also analyze the underlying infrastructure, such as the IaaS 615 environment, the PaaS 620 environment, and/or the SaaS 625 environment. Additionally, the scanning tool 605 (e.g., scanning layer) can occur externally and/or internally. For instance, the scanning tool 605 can be implemented externally relative to an application, and the tool can probe the application in a manner similar to an external hacker would follow. When external to the application, the tool might not have access to the underlying source code and other files. When internal relative to the application, the tool has access to the application's files.

The scanning tool 605 is provided read-only access 630 to a central repository that stores application related data. With this read-only access 630, the scanning tool 605 can perform a pen test or scan 635 on files 640, databases 645, or even infrastructure 650 associated with an application. The ellipsis 655 demonstrates how the scanning tool 605 can scan and analyze any other construct as well, without limit.

In some cases, the scanning tool 605 can use machine learning 660 to facilitate the scan 635 and even to analyze the results of the scan 635. Any type of ML algorithm, model, machine learning, or neural network may be used to facilitate operations associated with the scan 635.

As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The scanning tool 605 is also able to access or query a public database 665, which may be located remotely from the scanning tool 605. The public database 665 can include a listing of known threats 670, such as spyware, malware, trojans, viruses, ransomware, and so forth. By consulting the public database 665, the scanning tool 605 can determine whether the application would be subject to any of those known threats 670.

As will be discussed in more detail later, a user interface UI 675 can also be provided for the scanning tool 605 to enable users to configure the scanning tool 605 and to interact with the results 680 generated by the scanning tool 605. For instance, the UI 675 can display a list of vulnerabilities 680A that the application is likely subject to, based on the scan 635 performed by the scanning tool 605, where the vulnerabilities 680A are included as a part of the results 680.

When the scanning tool 605 is applied to a new application, then the scanning tool 605 can complete a full scan of the application's entire contents and associated components, to thereby generate an initial baseline scan of the application. During subsequent scans of an application, however, the scanning tool 605 can scan and analyze only the changes or deltas (e.g., as shown by delta 685) between the initial version or subsequent version and the immediate version of the application. By analyzing only the deltas, the scanning tool 605 can significantly speed up the scanning process.

If the scanning tool 605 identifies potential vulnerabilities in the application, then the scanning tool 605 can surface an alert 690, potentially in the UI 675, to inform the user of the vulnerabilities. This alert 690 can list the vulnerabilities as well as their levels of severity. Further details on such alerts will be provided later in some of the subsequent figures.

Even after an application is deployed, the scanning tool 605 can still be used to analyze and even protect an application. For instance, the scanning tool 605 can monitor the application as well as traffic flowing to and from the application. In doing so, the scanning tool 605 can detect when the application is being attacked (e.g., as shown by attack 695), such as by a denial of service attack, which is a type of fast brute-force attack.

The scanning tool 605 can detect other types of attacks as well, such as malware attacks, ransomware attacks, and so on. In addition to fast or "brute-force" attacks, the scanning tool 605 can also detect when low and slow attacks are occurring such as Distributed Denial of Service (DDoS) attacks.

A slow attack is a type of attack in which a small stream of traffic is targeting an application. Unlike volume based attacks, slow attacks slowly drain the system. Since slow attacks occur slowly, eventual detection is appropriate. Such attacks can be difficult to detect. In slow attack cases, network traffic can be sampled over time. The scanning tool 605 is able to analyze a data packet's fingerprint 695A to determine where the packet originates and/or through which computing devices the packet has passed through. When a slow attack is detected, the scanning tool 605 can send a notification to the result(s) 680 or display a notification on the UI 675 indicating a potential attack.

By consulting the public database 665, the scanning tool 605 can discern, based on the fingerprint 695A, whether the application is subject to a fast brute-force attack or a low and slow attack. Notably, the fingerprint 695A can include various identifying information, such as which devices (e.g., routers, switches, computers, etc.) were used to transmit a particular data packet. The fingerprint 695A can be inspected without necessarily inspecting the contents of the data packet.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
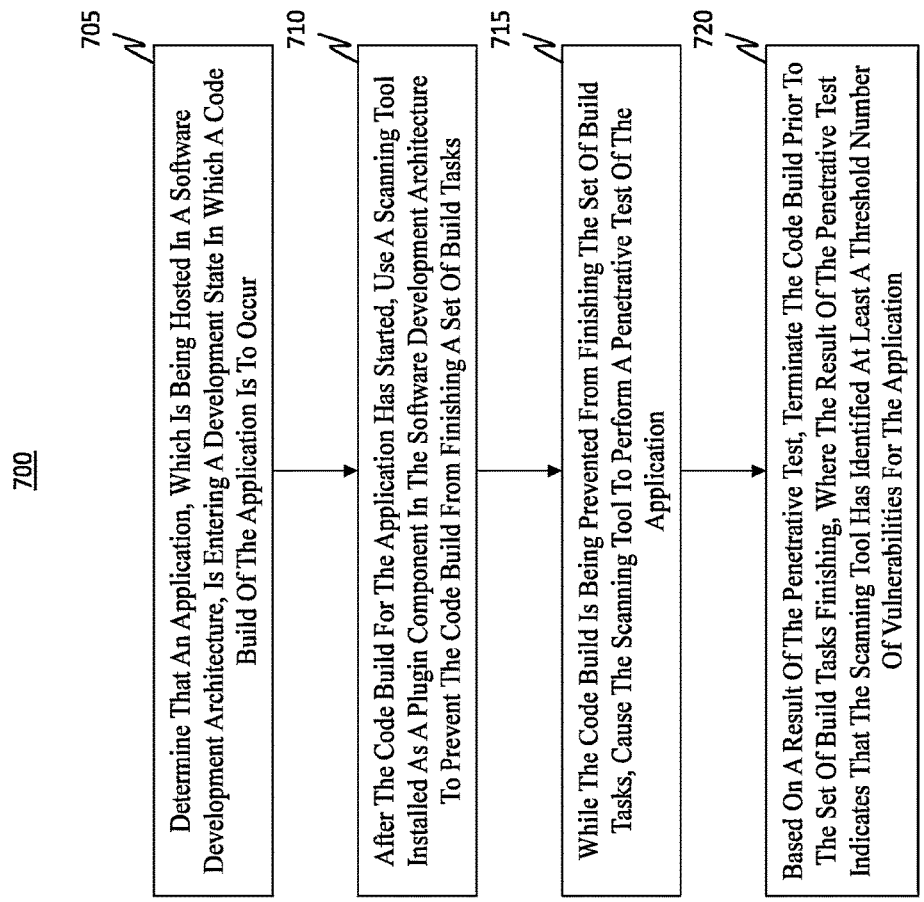
FIG. 7 illustrates a flowchart of an example method for dynamically controlling whether a code build completes or fails to complete.

Attention will now be directed to FIG. 7, which illustrates a flowchart of an example method 700 for dynamically controlling whether a code build of an application finishes to completion or is terminated prior to completion. Method 700 can be implemented in the architecture 600 of FIG. 6 by the scanning tool 605.

Initially, method 700 includes an act (act 705) of determining that an application (e.g., application 405 of FIG. 4), which is being hosted in a software development architecture (e.g., software development architecture 410), is entering a development state (e.g., development state 420) in which a code build (e.g., code build 425) of the application is to occur.

In some cases, the process of determining that the application is entering the code build development state can be performed by the scanning tool interacting with the computer system's operating system (OS) to determine what state the application is currently in and what state the application is transitioning to. In some cases, the scanning tool can also intercept inter-application communications to identify that application's state. In some cases, the scanning tool can identify when a build tool or compilation tool is launched, which tool is then used to facilitate the code build process. Accordingly, there are numerous different techniques to determine when the code build process will occur, and the scanning tool can perform the operation of determining that the application is entering the development state. In some cases, the scanning tool is launched or triggered when the application enters the build state. For instance, a library or software development kit (SDK) can be installed as a part of the infrastructure, and that library can follow policy indicating that the scanning tool is to be initialized or launched once the application enters the build state.

After the code build for the application has started, there is an act (act 710) of using a scanning tool (e.g., scanning tool 605 of FIG. 6) installed as a plugin component in the software development architecture to prevent the code build from finishing a set of build tasks (e.g., build tasks 430 of FIG. 4). The process of preventing the code build from finishing can include interjecting a delay command into the build process to prevent the code build from completing. The prevention process can also include pausing the code build using any other techniques available to pause a routine. Although the above description indicated that the scan can occur after the build starts, it should be noted that other scans can occur at other times as well. For instance, a scan can occur in response to code being checked in or committed as well.

While the code build is being prevented from finishing the set of build tasks, act 715 involves causing the scanning tool to perform a penetrative test (e.g., security scan 500 of FIG. 5) of the application. With this penetrative test, the scanning tool exercises the application in numerous different ways in an attempt to identify vulnerabilities that the application might have. The penetrative test can also optionally include scanning the underlying infrastructure in which the application is being developed, such as whatever cloud platform is hosting the application.

Based on a result of the penetrative test, there is an act (act 720) of terminating the code build prior to the set of build tasks finishing, such as when the results indicate certain vulnerabilities. Notably, the result of the penetrative test indicates that the scanning tool has identified at least a threshold number of vulnerabilities for the application. The threshold number can be adjustable. If the number of vulnerabilities meets or exceeds the threshold, then the scanning tool terminates the code build. In some cases, terminating the code build is performed by throwing an error such that the code build ends. In some cases, terminating the code build is performed by ending tasks associated with the code build. In some cases, the termination process is performed by the scanning tool instructing the OS to end the code build and/or instructing some other component to end the code build.

In some implementations, the set of build tasks includes pushing an update to a client device. Here, the code build can optionally be terminated prior to pushing that update to the client device.

In some cases, one or some of the vulnerabilities that were detected as a result of performing the pen test can be resolved by the disclosed embodiments. For instance, a number of mitigation operations can be performed in an attempt to fix or resolve the vulnerabilities. Such mitigation operations can include closing ports that might be open on a device, establishing a firewall, alerting an administrator, or perhaps even terminating a network connection. Mitigation operations can also be performed when attacks against the application or computer are detected.

In some implementations, the code build is allowed to complete, such as when the number of detected vulnerabilities does not exceed a threshold. Therefore, in some cases, the set of build tasks can be performed and the new update or application can be pushed out to the public.

Example User Interfaces and Processes Relating to a Scanning Tool

Attention will now be directed to FIGS. 8 through 24F. These figures illustrate various user interfaces that can be displayed on a device and that can display operations associated with the scanning tool 605 of FIG. 6. As an example, these various user interfaces can represent the UI 675 of FIG. 6. Furthermore, these various user interfaces can display the results 680.

Figure 8:
FIG. 8 illustrates an example user interface showing various tab features.

FIG. 8 shows an initial user interface 800 that is available when a user first logs into the scanning tool application. Here, there are a number of tabs, such as tab 805, tab 810, and tab 815. These are for example purposes only, and more or less tabs can be used. Tab 805 refers to a "Managed Services" option; tab 810 refers to a "Scans" option; and tab 815 refers to a "Red Teaming" option. The features associated with each tab will be discussed in detail.

Figure 9:
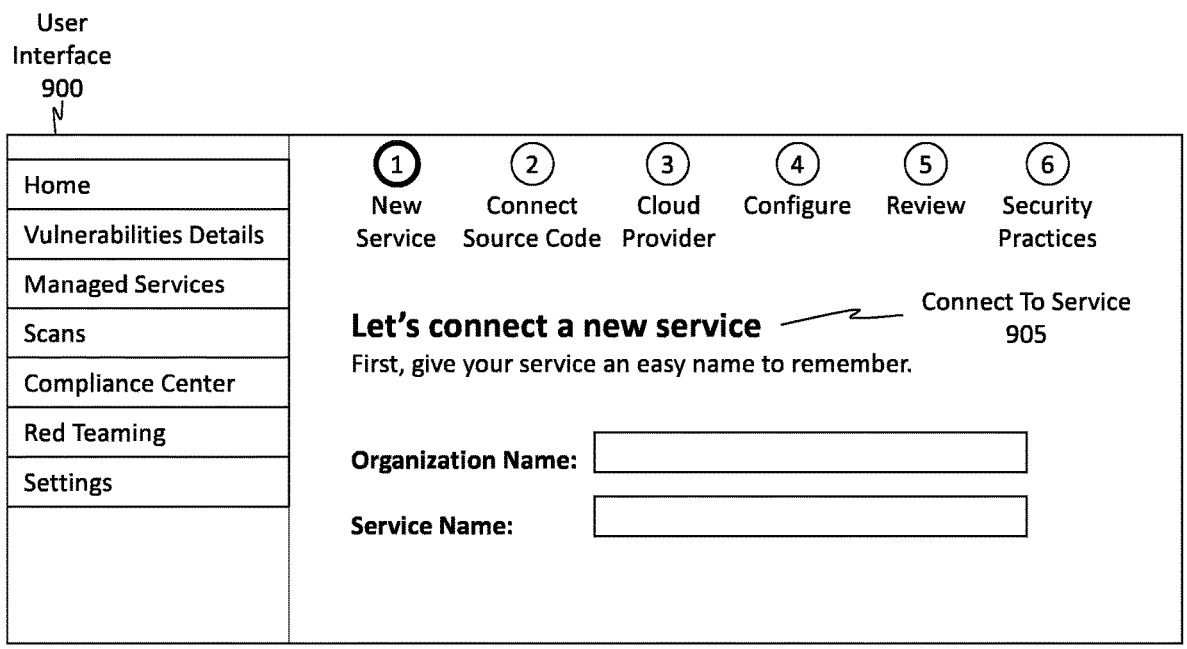
FIG. 9 illustrates an example user interface showing an option to connect to a service.

FIG. 9 shows a resulting user interface 900 that is displayed in response to selecting the tab 805 (i.e. "Managed Services"). User interface 900 is designed to help a user connect to a new service, as shown by connect to service 905. In this context, the "service" is one that is to be reviewed and analyzed by the scanning tool, such as the application 405 of FIG. 4.

Here, the user can enter the organization name of the service (e.g., "SafeOps Demo") as well as the service's name (e.g., "frontend"). User interface 900 shows the first step (e.g., "New Service") of a six part step, as indicated by the flowchart near the top of the user interface 900 (e.g., step 1 is "New Service;" step 2 is "Connect Source Code;" step 3 is "Cloud Provider;" step 4 is "Configure;" step 5 is "Review;" and step 6 is "Security Practices").

Figure 10:
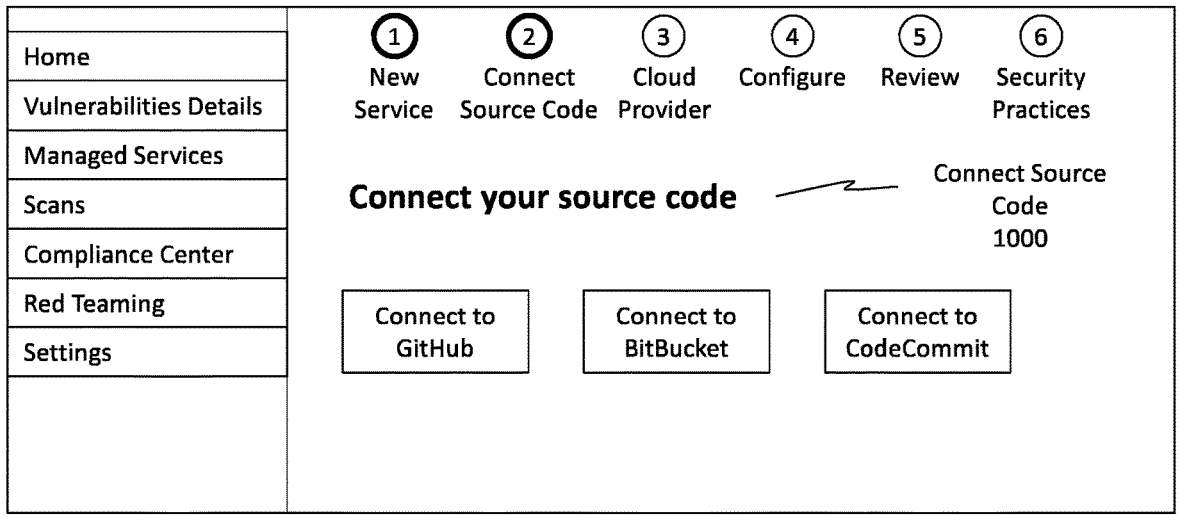
FIG. 10 illustrates an example user interface showing how to connect to source code.

FIG. 10 shows step 2 (e.g., "Connect Source Code") of the six part process. Here, the user is able to connect his/her source code to the scanning tool, as shown by connect source code 1000. As discussed previously, the source code is stored in a central repository, such as central repository 325 of FIG. 3. Optionally, that central repository can be GitHub™, BitBucket™, or any other source code repository. Indeed, the scanning tool is able to connect to any type of repository, without limit.

Figure 11:
FIG. 11 illustrates an example user interface showing a configuration option.

In this example process, the user has indicated that his/her code is stored in a GitHub™ repository. FIG. 11 shows a configuration 1100 option for enabling the scanning tool to have read-only access to that repository. Of course, the principles should be construed broadly in that the user interface can be customized to accommodate the configuration for any type of repository. In FIG. 11, the user interface (and hence the scanning tool) is acquiring additional information regarding the configuration settings of the repository so that the scanning tool has adequate permissions to access and analyze the service's, or rather the application's, source code and associated files in order to detect vulnerabilities.

FIG. 12 shows options for the third step (e.g., "Cloud Provider"). Specifically, FIG. 12 shows options to enter cloud details 1200 of whatever cloud platform the user is using to host and/or develop his/her application. The scanning tool is able to connect to any cloud provider. Examples of cloud providers include, but certainly are not limited to, Amazon AWS™, Microsoft Azure™, Google Cloud Platform™, VMWare™, and so on without limit. Using the interface shown in FIG. 12, the user can enter configuration details to enable the scanning tool to obtain access (read-only) to the cloud platform hosting his/her application. FIG. 13 shows additional options for entering cloud details 1300.

Figure 14:
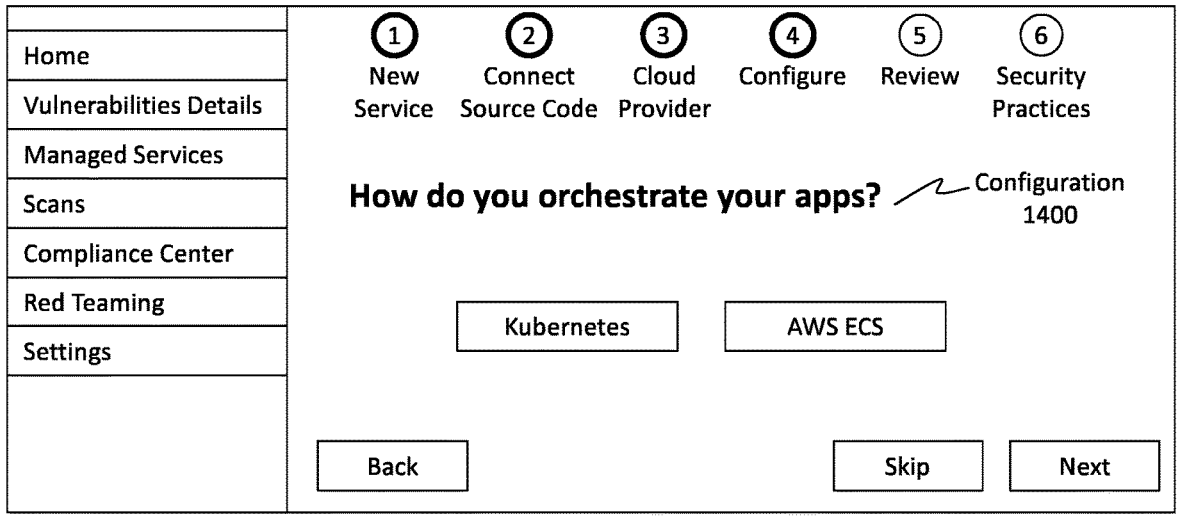
FIG. 14 illustrates an example user interface having an option to configure certain settings.

FIG. 14 shows step four (e.g., "Configure"), where the user can enter configuration 1400 details regarding how his/her application is orchestrated. In this example case, the user can select Kubernetes™ or AWS Of course, other options can be made available.

Figure 15:
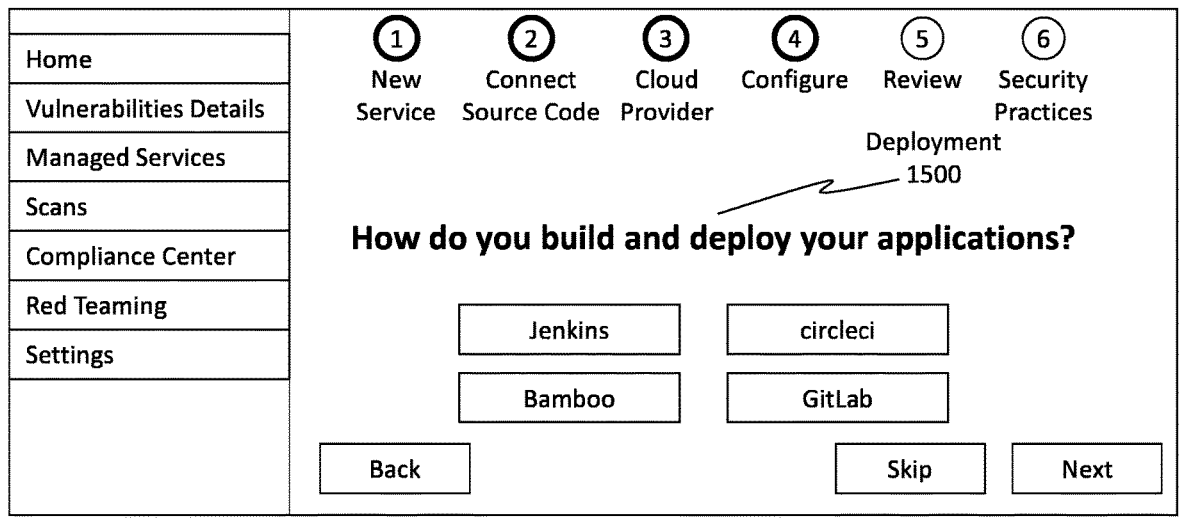
FIG. 15 illustrates an example user interface having an option for specifying deployment options.

FIG. 15 includes options for receiving input regarding the deployment 1500 application the user uses. Here, four different options are listed, but one will appreciate how any number can be provided.

FIG. 16 shows a dashboard 1600 that facilitates the fifth step (e.g., "Review"). With the dashboard 1600, the user can enter additional details about his/her application, such as a URL that can be used to connect to the application, username and password details, environment details, and further repository details. FIG. 17 then shows details for the sixth step (e.g., "Security Practices"). This interface allows the user to enter security 1700 information, such as firewall details, intrusion detection system details, and so on.

After the initial configuration, the scanning tool now has adequate permissions to scan the service/application. Accordingly, using the principles discussed previously, the scanning tool scans the service in an attempt to identify vulnerabilities. This scanning process is triggered when the application is subject to a code build process.

Figures 18, 19:
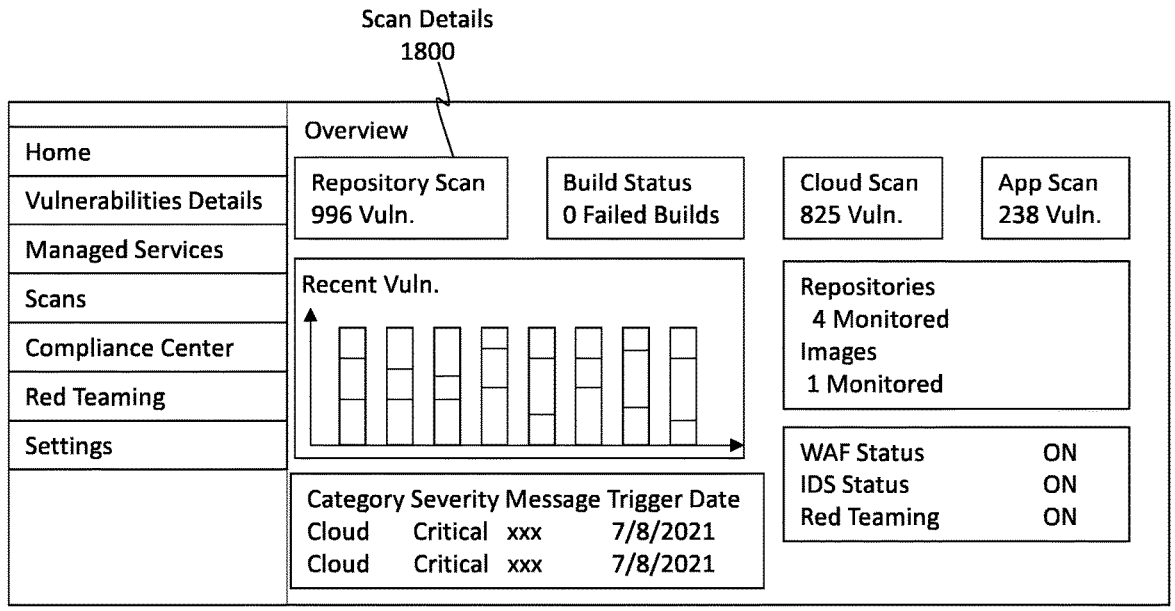
FIG. 18 illustrates details about a scan.
FIG. 19 illustrates details about multiple scans.

FIG. 18 shows various scan details 1800, which include details on current and previous scans that have been performed for the user's application. Here, the scan details 1800 list the number of vulnerabilities that were detected, when the last scan was performed, details about a build status, details about a cloud scan, details about an application/service scan, and details about a repository scan. With the interface shown in FIG. 18, a user can readily see the status of his/her scans and vulnerabilities.

FIG. 19 shows the resulting interface when a user selects the tab 810 in FIG. 8 (i.e. the "Scans" tab). Here, the interface provides details regarding scan 1900. Notice, the scans 1900 include an application scan, a cloud scan, an image scan, a Kubernetes™ scan, and a repository scan. The interface also displays the status of those scans (e.g., running, pending, etc.), when those scans were last run, a blackout time (e.g., a time when the corresponding component is down and not available for use by the public), and an option for adjusting settings for those scans.

Figure 20:
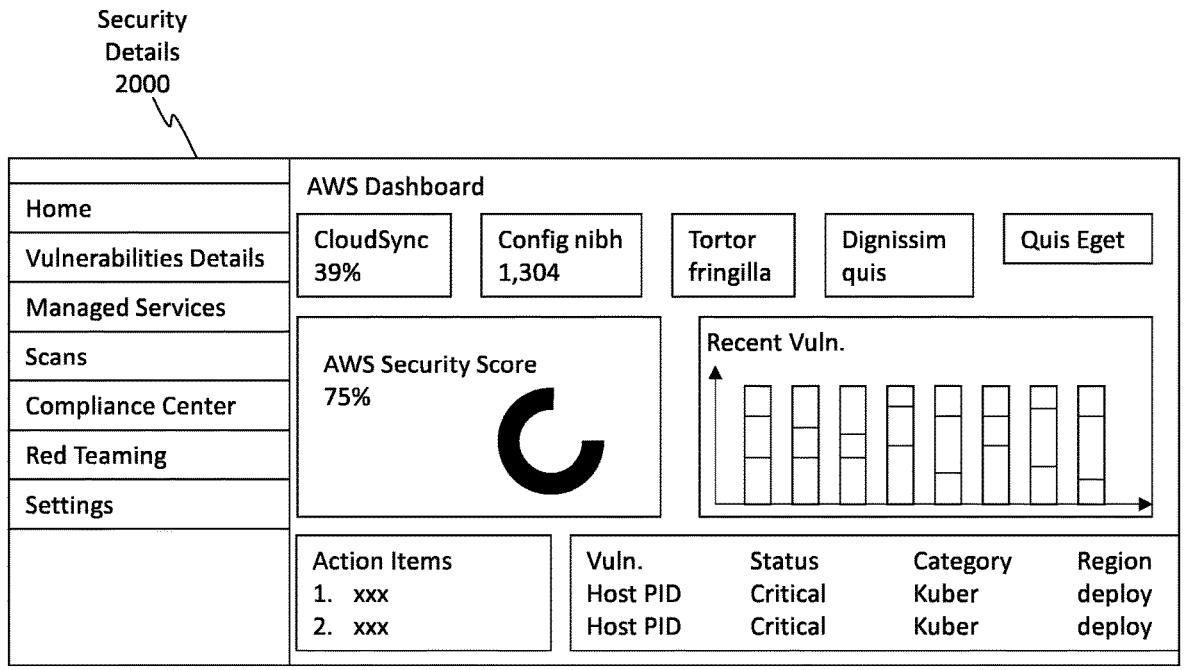
FIG. 20 shows another dashboard illustrating details about a security scan.

FIG. 20 shows an interface configured to display additional security details 2000. For instance, the scanning tool is able to scan and analyze an application and then generate a "Security Score." This score, which can be normalized for use across any number or type of applications, can be a score that generally reflects how secure the application is, based on the detected vulnerabilities. The security details 2000 can list a summary view of the various vulnerabilities, including unknown or unprecedented potential vulnerabilities, informational details, minor vulnerabilities, major vulnerabilities, and critical vulnerabilities. In this sense, the scanning tool is able to rank and prioritize its findings or results. In some cases, machine learning can be used to generate the score based on the findings or results of the scan.

In some cases, the machine learning can be used to rank the various vulnerabilities into respective severity categories. The machine learning can perform this ranking by predicting how much of an impact the exploitation of a particular vulnerability would have against a computer or the application. For instance, the machine learning can predict that exploiting a particular vulnerability might enable a hacker to crash the computer or application while in another case exploiting a particular vulnerability might simply slow down a computer. Indeed, the machine learning can make various predictions regarding the impact or consequence that a particular vulnerability might have.

Figure 21:
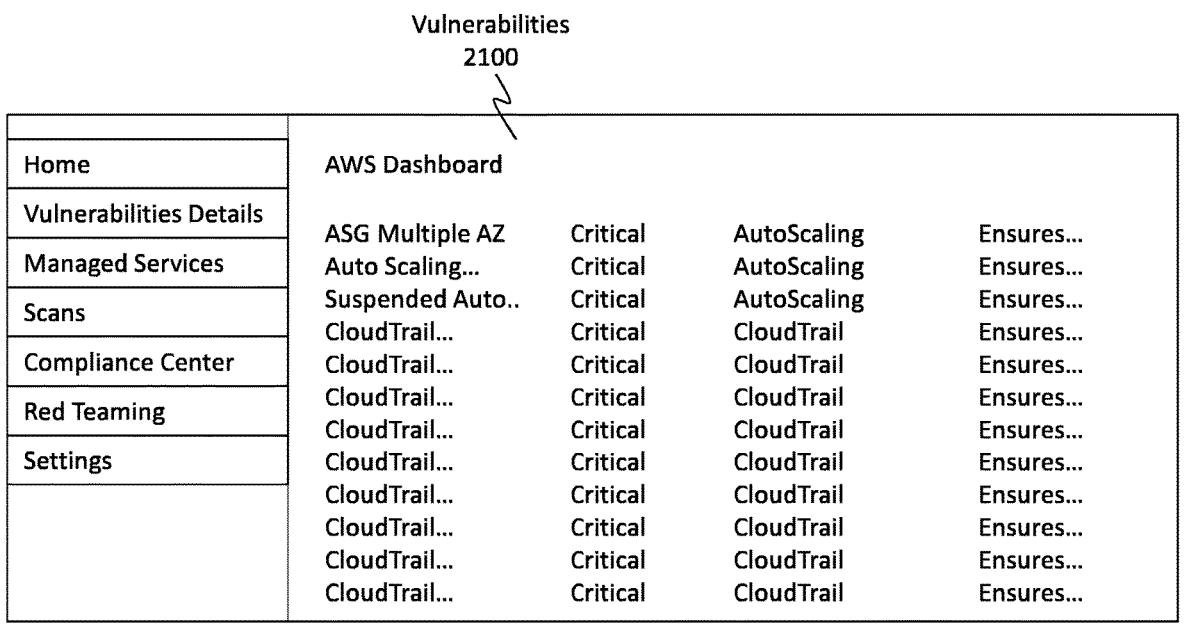
FIG. 21 shows various vulnerabilities that have been uncovered or discovered.

FIG. 21 shows an interface that provides additional details regarding the vulnerabilities 2100 detected by the scanning tool. Such details can include a title of the vulnerability, a severity, a category, the test used to detect the vulnerability, where the vulnerability is located, and additional comments or details on the vulnerability.

The vulnerabilities can be reviewed as a part of a so-called "Red Teaming" operation. This review can be performed automatically by a machine learning component or, alternatively, the review can be conducted by a team of trained computer experts who are trained to identify vulnerabilities and then attempt to exploit those vulnerabilities (i.e. hackers). The team attempts to exploit those vulnerabilities in a controlled setting in order to inform the user or owner of the application how his/her application is likely to be attacked. The disclosed embodiments also provide enhanced education and training to enable users to know and understand what security threats their applications may face. In this sense, the embodiments and disclosed tools provide a knowledge base for identifying, understanding, and even potentially resolving security issues.

Optionally, the team can also attempt to devise solutions that would cure the vulnerability. In some cases, a single solution might fix or resolve multiple vulnerabilities. In some cases, the Red Teaming organization can attempt to hack the application in other ways that potentially were not identified by the vulnerabilities.

With the "Red Teaming" option, an instance of the application can be reserved for a period of time or a window of reserved time. Additionally, or alternatively, the application can be taken offline for a planned outage. In any event, the application can be reserved for a period of time. During that time, the Red Teaming group (e.g., human users and/or machine learning) can attempt to exploit or exercise the application in an effort to identify weaknesses or vulnerabilities. Once these vulnerabilities are identified, then the Red Teaming group can propose fixes on how to resolve those vulnerabilities. The user interface can display the notes and solutions, as shown by red team 2200 in FIG. 22.

As discussed previously, the disclosed embodiments are able to allow a code build process to complete or, alternatively, can disrupt the code build process such that it fails to complete. In some cases, the embodiments disrupt the code build process when a threshold number of vulnerabilities are detected and/or when certain types of vulnerabilities are detected. FIG. 23 is illustrative.

FIG. 23 shows an interface that allows a user to adjust various settings 2300. Specifically, the interface in FIG. 23 shows a threshold 2305 option that can be adjusted. When the scanning tool detects a number of vulnerabilities that meet or exceed the threshold 2305 (e.g., in this case the threshold 2305 is set to a value of "80"), then the code build process will be disrupted and the code build will be prevented from completing.

Additionally, FIG. 23 shows another threshold listing a "Max Critical Issues," which is currently set to a value of "5." That is, the scanning tool is able to rank vulnerabilities based on a level of severity. Some vulnerabilities can be classified or ranked as being "Critical" (i.e. these should be resolved immediately), some can be ranked as "Major" (i.e. these should be resolved within a short time period but are not as high priority as the "Critical"), and some can be ranked as "Minor" (i.e. these should be resolved at some time in the future). Of course, other labels can be used.

Here, if the number of vulnerabilities ranked as being "Critical" exceed the "Max Critical Issues," then the scanning tool will terminate the code build process, even if the threshold 2305 has not yet been reached. In this sense, the "Max Critical Issues" threshold has a higher priority over the threshold 2305 and can terminate the code build independently of the threshold 2305.

Figure 24A:
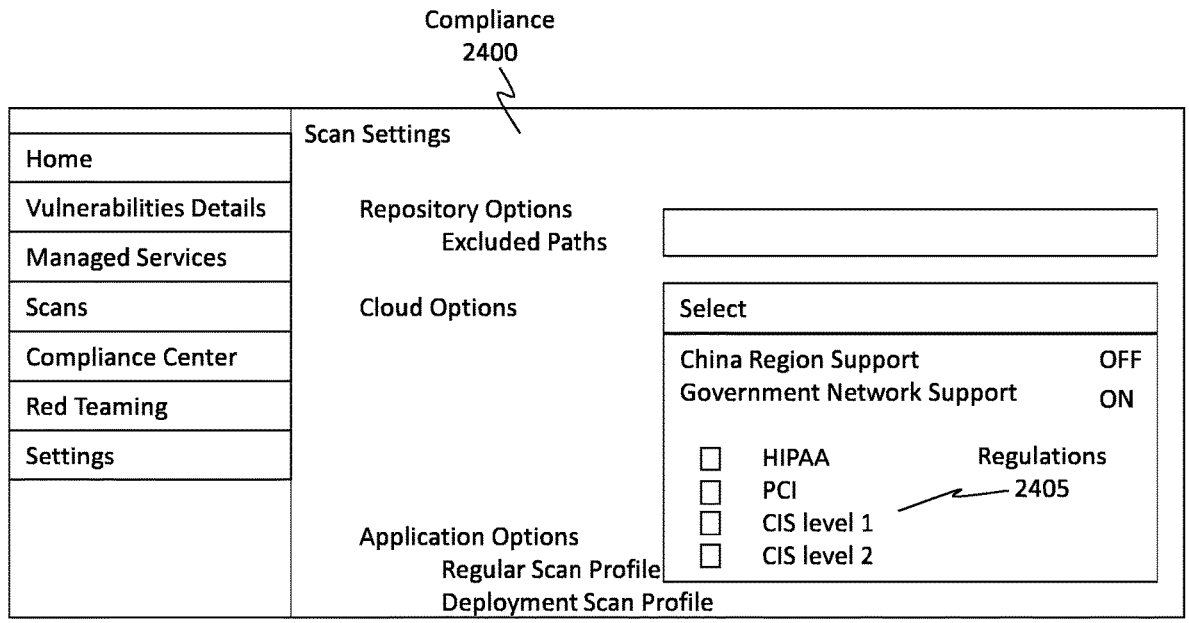
FIG. 24A shows an option for performing a compliance scan.

FIG. 24A shows an interface that allows a user to impose various compliance 2400 requirements, or rather, to determine whether an application complies with the compliance 2400 requirements. To illustrate, the interface lists a number of different regulations 2405, such as HIPAA, PCI, CIS level 1, and CIS level 2 regulations. By selecting any one or more of the regulations 2405, the scanning tool can analyze the underlying application, including source code, to determine whether that application complies with the selected regulations 2405. If the application complies, then the scanning tool can generate an alert reflecting the compliance. On the other hand, if the application does not comply, then the scanning tool can generate an alert reflecting how and where the application does not comply. The scanning tool can also analyze the underlying infrastructure (e.g., cloud platform, deployment platform, orchestrate platform, etc.) to determine whether that infrastructure is or is not in compliance as well.

Figure 24B:
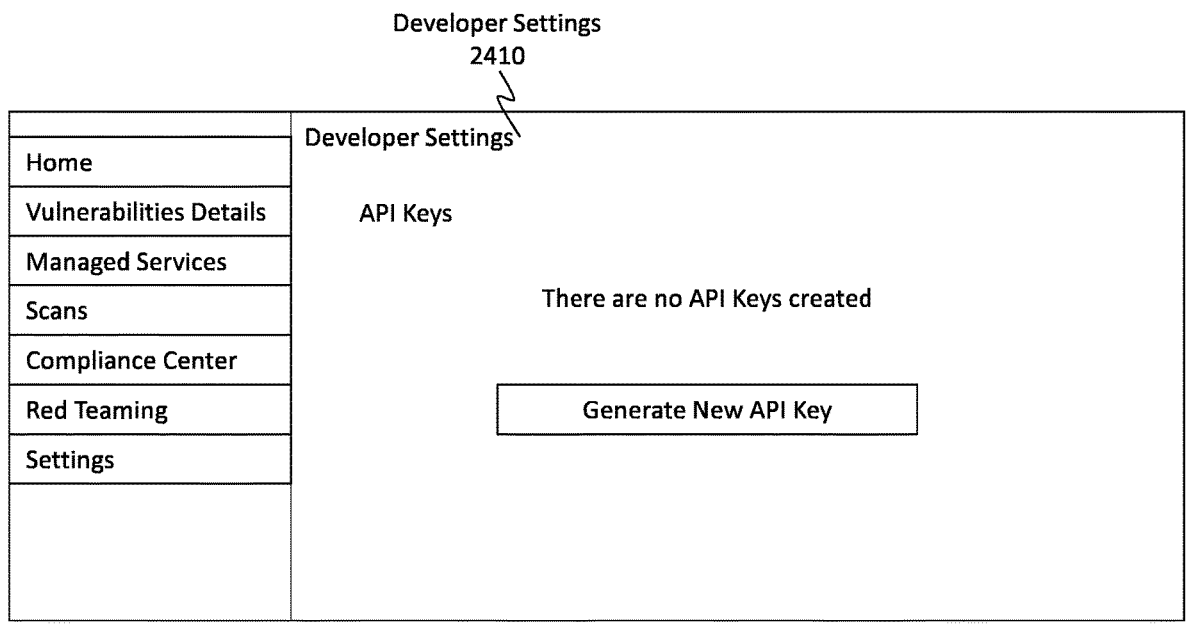
FIG. 24B shows an example user interface for configuring developer settings.

FIG. 24B shows a set of developer settings 2410 that are modifiable by the user. For instance, FIG. 24B shows how a user can enter and edit various API keys in order to enable applications to interact with one another.

FIG. 24C shows an example configuration 2415 user interface that allows the user to enter image registry information. For instance, the disclosed tools can receive information about an application's registry credentials in order to access an application's image. Relatedly, FIG. 24D shows an example configuration 2420 user interface that can be used to obtain additional information regarding locations where an application's image or images are stored.

Figure 24E:
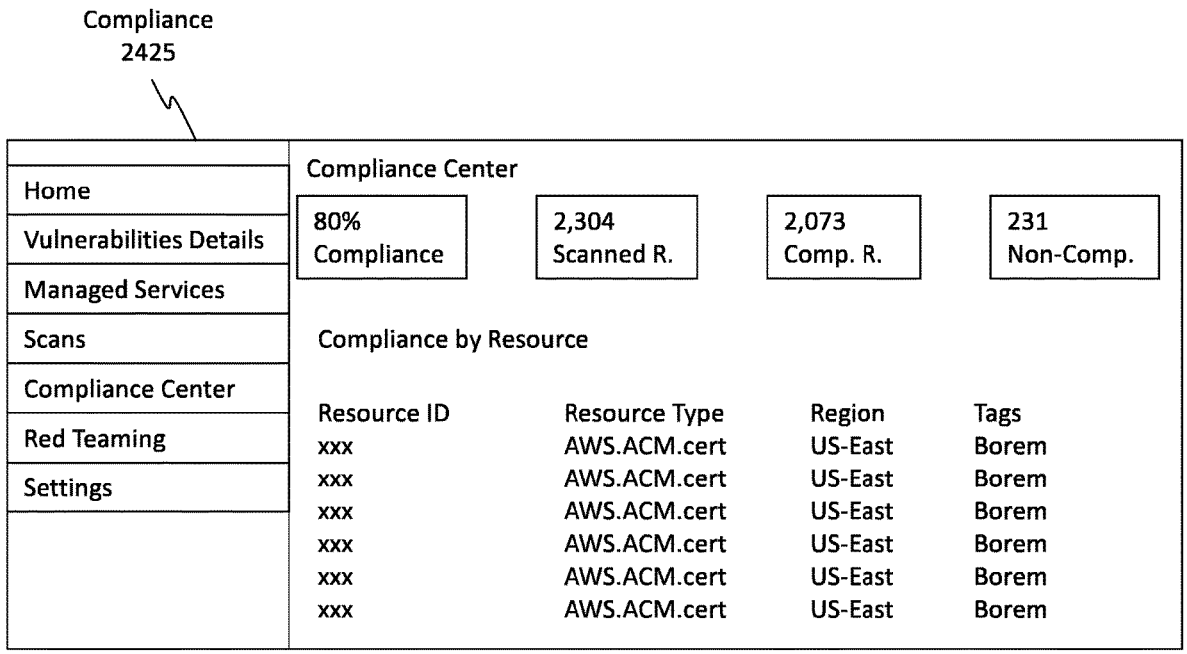
FIG. 24E shows an interface for determining compliance of an application.

FIG. 24E shows a compliance 2425 user interface that shows, based on results of the scanning operations, whether an application is in compliance with various compliance requirements, as discussed previously. The compliance 2425 interface can provide a percentage indicator to reflect a level of compliance the application has with certain standards or regulations (e.g., 80% compliance).

Figure 24F:
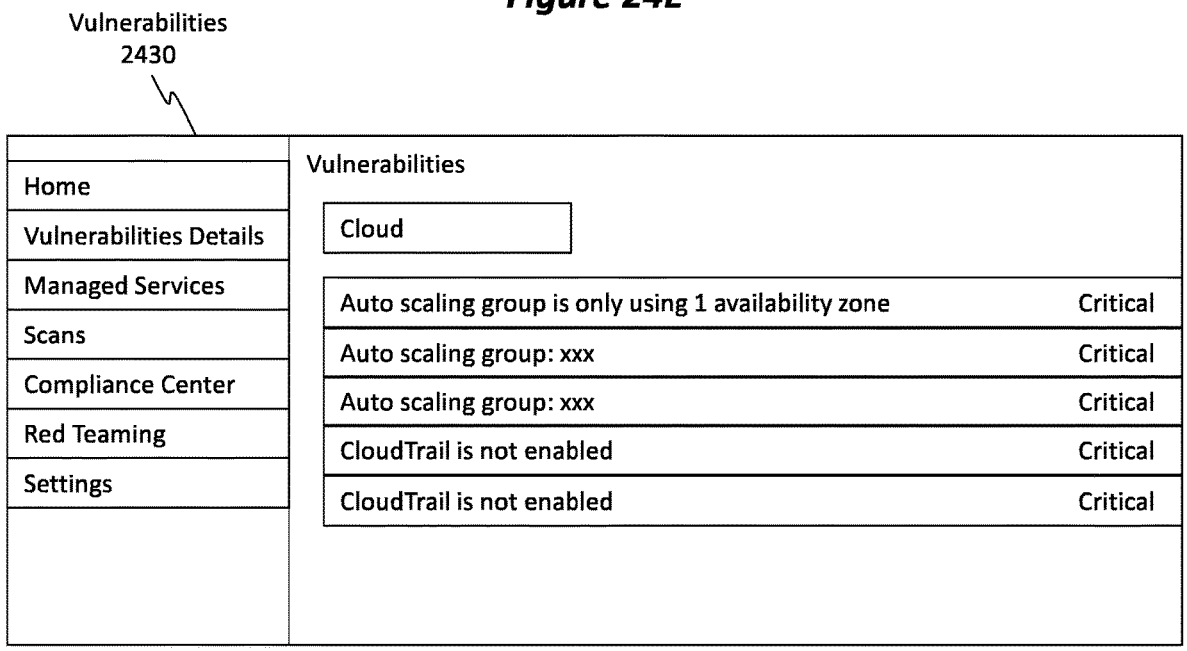
FIG. 24F shows an interface listing various detected vulnerabilities.

FIG. 24F shows a vulnerabilities 2430 user interface that lists identified vulnerabilities an application might have, as identified by the scanning tool. Status or severity indicators can be displayed next to each vulnerability that is identified.

Example User Interfaces Post Scanning

Figure 25:
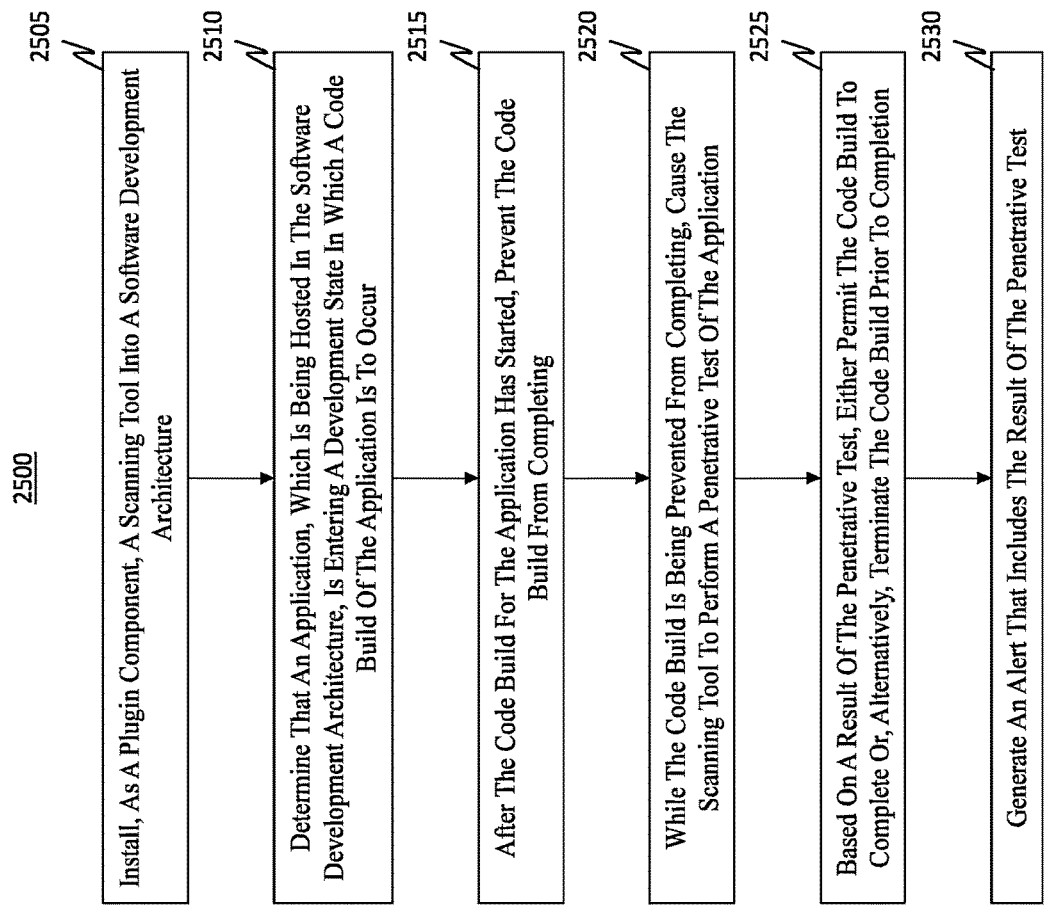
FIG. 25 shows another flowchart of an example method for controlling a build process.
Figure 26:
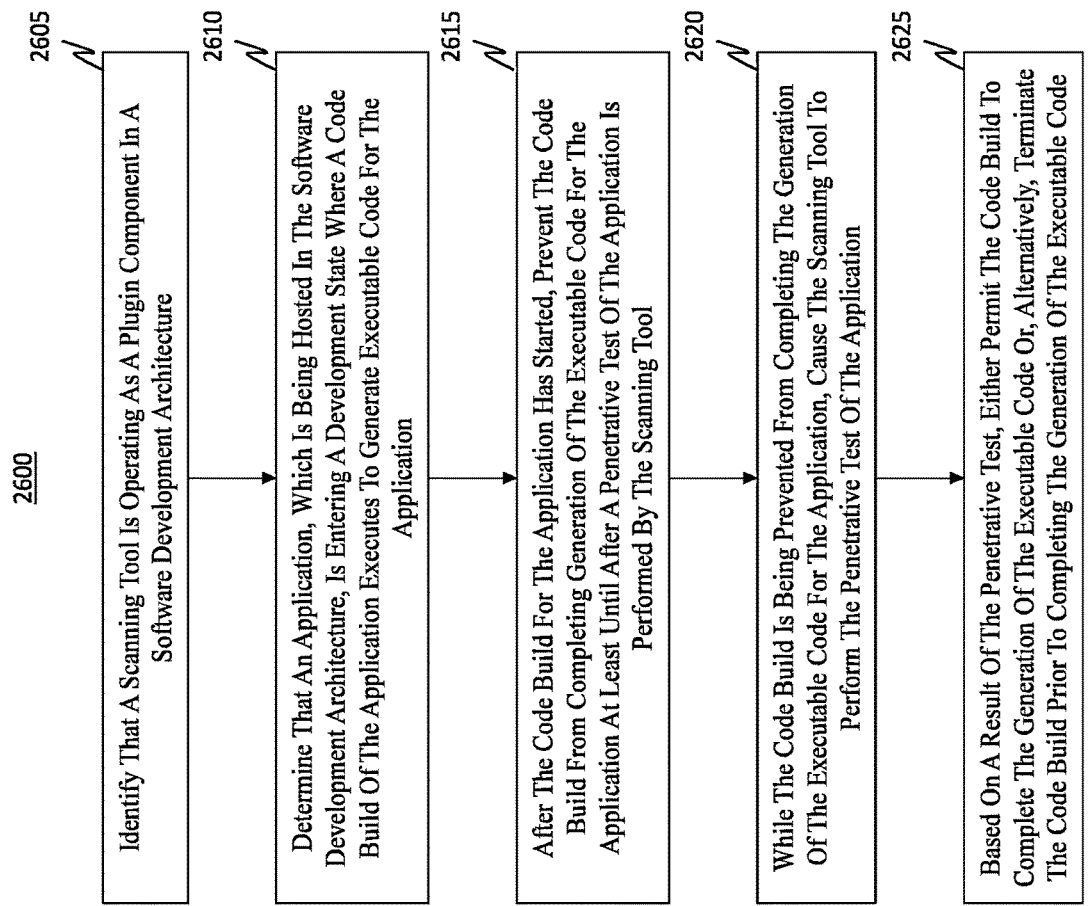
FIG. 26 shows yet another flowchart of an example method for dynamically controlling a code build.

FIGS. 25 and 26 illustrate various different methods that can be implemented. The discussion on these methods will be presented shortly. That being said, attention is now given to user interfaces which are created and accessed after using the scanning tool described above. Various UIs can be displayed on a device. For discussion purposes, specific examples of the various UIs are discussed in more detail below.

Figure 27:
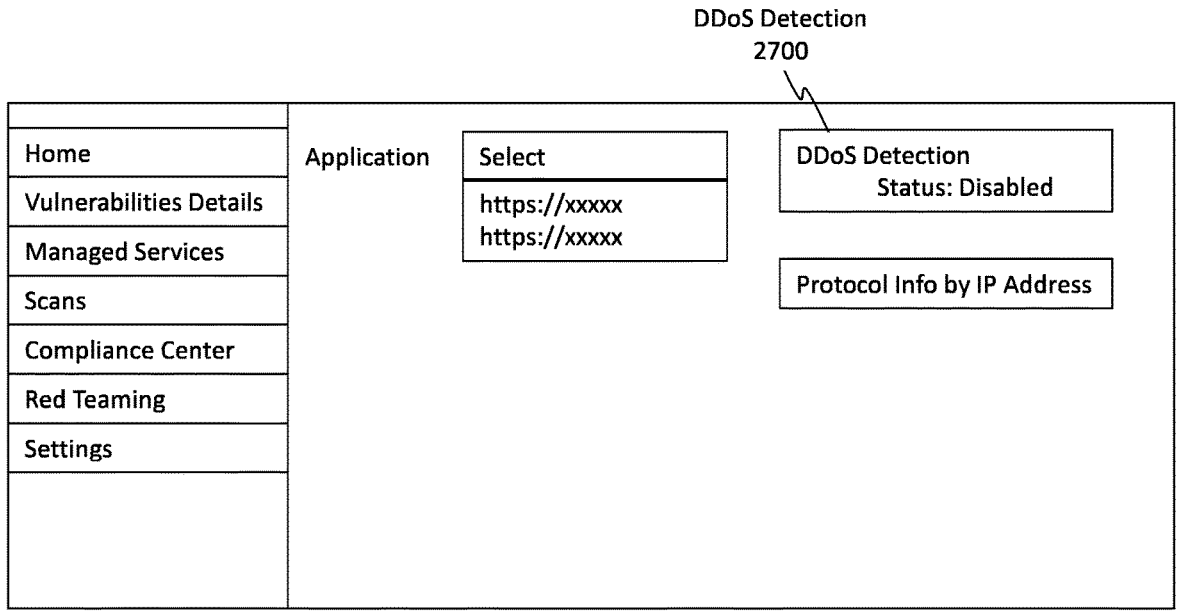
FIG. 27 shows an interface with a DDoS detection section.

In the case of a slow attack, FIG. 27 illustrates an example of a UI which can display a DDoS detection section 2700. This section can include details relating to a detected potential slow attack based on suspicious behavior. Suspicious behavior can be indicated by a change in access patterns, unusual application actions, or by using a ML algorithm trained to detect suspicious behavior. In the case where ML algorithms are used, intelligent information is utilized to improve slow attack detection.

Figure 28:
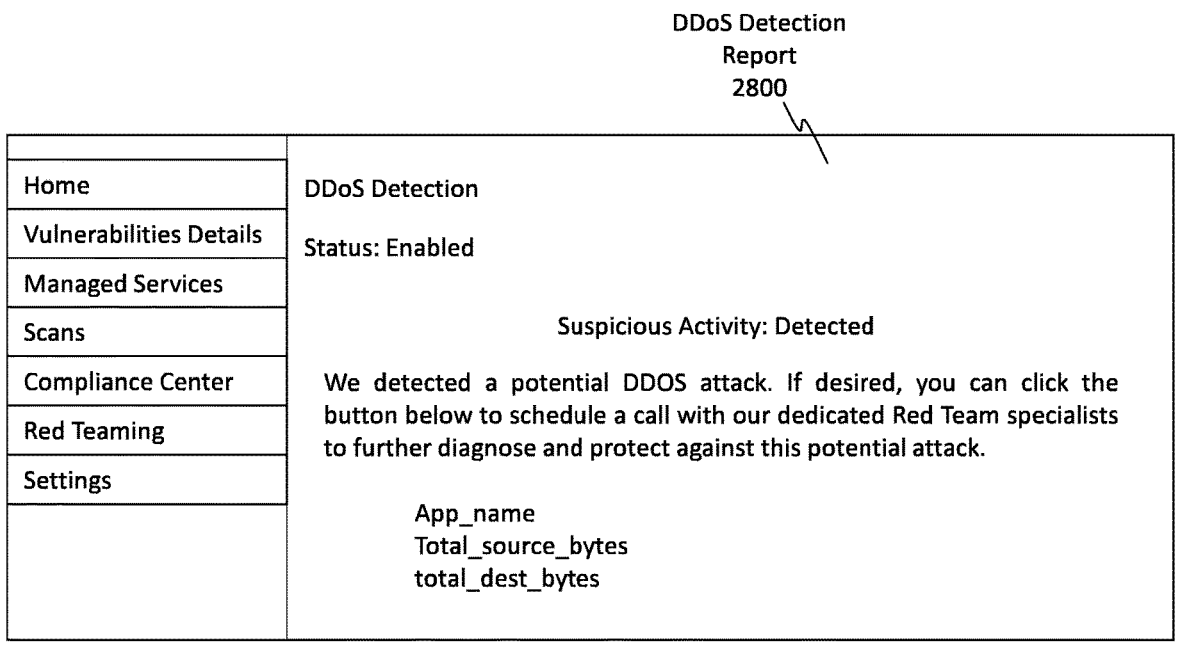
FIG. 28 shows an example DDoS detection report.

FIG. 28 illustrates an example detection report 2800 generated from the DdoS section. The detection report can be shown on a different page or downloaded as an external file. The detection report can show the status of the scanning tool (e.g., active or inactive) and a log of suspicious activity sorted by pre-defined fields. The pre-defined fields can include any type of pre-defined field, without limitation. In some cases, the fields can include, but certainly are not limited to, the identity of a user, the identity of a computer, the network name or network connection, any type of telemetry data or metric data, the use of a VPN, and so on. The detection report also includes details regarding the indicators used to determine a potential attack. These indicators can be pre-defined or determined by the ML algorithm. Some example indicators include, but certainly are not limited to, timing factors, usage factors, identify factors, and so on.

In some implementations, the embodiments allow a user to connect to real time support engine or module. When real time support is requested, an engineer can instantly be connected to the client and/or an online scheduling tool (e.g., google meet). In the case where an online scheduling tool is accessed, the client is able to schedule a time to meet with the engineer to discuss potential DdoS issues or other security issues. Other options include on demand re-teaming, as described above, scheduling.

Figures 29, 30:
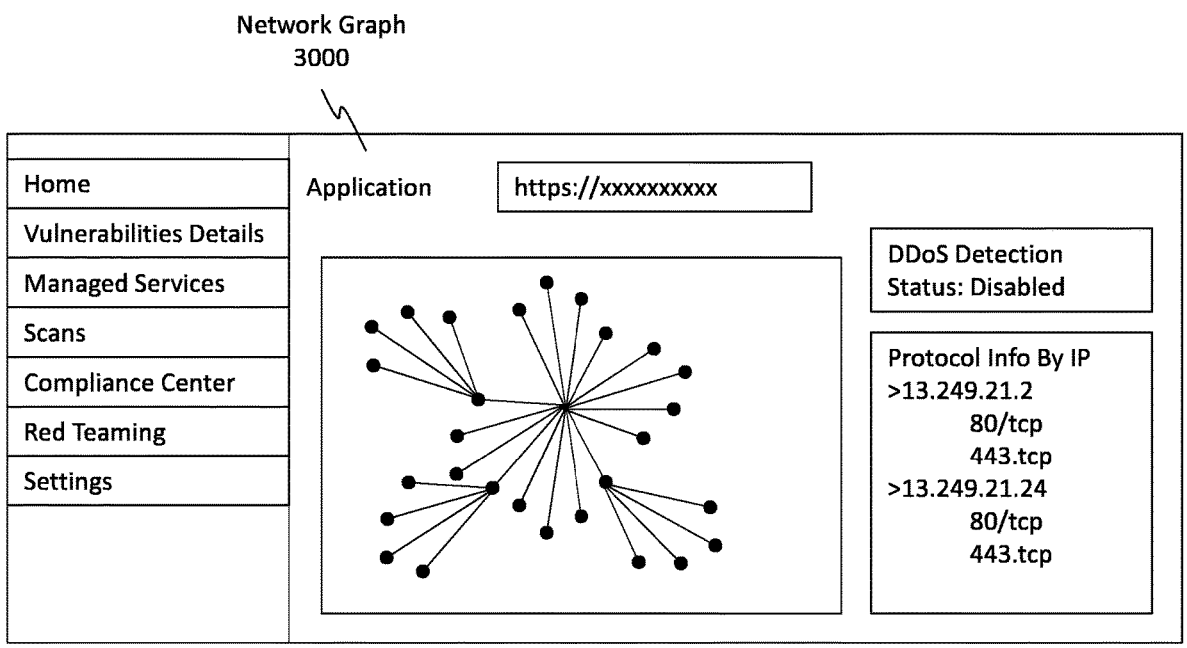
FIG. 29 shows an example recommendation engine.
FIG. 30 shows an example network graph.

FIG. 29 shows an example recommendation engine UI 2900. The recommendation engine aggregates all detected issues, including pen tests, red teaming, and other security issues into a single UI. The recommendation engine can be organized into categories such as cloud recommendations, application recommendations, repository recommendations, and other recommendation categories where each category may include multiple items. The recommendation engine also includes the percentage of issues found per item, the number of issues found per item, and a drop down option to show more details regarding the recommendations for each item.

When more details regarding the recommendations for each item are visible, a check list of items is shown each relating to a suggested or recommended solution to the identified security issue. In some embodiments, the recommendation engine is integrated with online delegation software (e.g., Trello, Microsoft ToDo, etc.) and assigns tasks to appropriate employees. For example, a security issue involving the cloud can be sent to a cloud engineer and/or team while a security issue involving the application can be sent to an application engineer and/or team. Once a recommendation is completed, the recommendation engine automatically updates. A current and refreshed recommendation engine is then displayed with updated recommendations.

Some embodiments automatically resolve recommendations when the recommendation is clicked on. In this case, the system accesses a secure software platform which may implement the selected recommendation. The recommendation is then completed on the secure platform and the recommendation is marked complete in the recommendation engine.

FIG. 30 shows an example UI illustrating a network graph 3000. Based on a URL, embodiments can scan the domain and determine open ports on the domain. A network graph is produced which includes the IP address of each open port. The network graph can include indicators for each port illustrating potential security threats. For example, the ports on the network graph can be color coded where red indicates severe security threats, yellow indicates some security threats, and green indicates no security threats.

The network graph UI can be interactive where hovering over a port gives additional information regarding the port. The additional information may include the IP address, URL, identified security issues, and recommended actions. The network graph UI can also include recommendations regarding closing inactive or underutilized ports. For example, a port can be opened for testing purposes only. Once the testing is completed, the port can remain open even though the port is no longer actively being used. The open port can serve as an access point for hackers and security threats to access other areas of the domain. The network graph UI can identify these open ports and recommend ports that are no longer used be closed to improve overall security.

Some embodiments provide a UI that facilitates a phishing campaign. Embodiments of the invention allows phishing campaigns to be created and monitored through the system instead of using third party software. The phishing campaigns can be designed to mimic a particular URL and change based on a time period (e.g., daily, weekly, monthly) or other condition. The system then monitors the number of usernames, passwords, and other sensitive information collected and displays it on the UI. Unlike traditional phishing campaigns, the UI allows for multiple targeted phishing campaigns to be created and implemented and results can instantaneously be analyzed all within the same platform. The data collected from the phishing campaign can further be implemented in the scanning tool and/or ML algorithms to better detect future vulnerabilities.

Additional Example Methods

Returning to FIG. 25, this figure shows a flowchart of an example method 2500 for dynamically controlling whether a code build of an application finishes to completion or is terminated prior to completion. Method 25 can be performed using any of the architectures mentioned herein as well as any of the user interfaces mentioned herein.

Initially, method 2500 includes an act (act 2505) of installing, as a plugin component, a scanning tool into a software development architecture. For instance, the plugin component can be installed in any of the cloud development platforms mentioned herein.

Act 2510 then includes determining that an application, which is being hosted in the software development architecture, is entering a development state in which a code build of the application is to occur. For instance, the scanning tool mentioned throughout this disclosure can operate with the system's OS or cloud services to determine when the application is to be built. In some cases, a library or SDK triggers the scanning tool when the application enters the build process. The configuration settings and user interfaces mentioned earlier can also be used to determine when the application is to be built. That is, as a result of configuring the scanning tool using the disclosed user interfaces, the scanning tool is afforded privileges into how the application operates and can thus identify when a code build is to occur.

After the code build for the application has started, act 2515 includes preventing the code build from completing. The process of preventing the code build from completing can be performed by delaying the code build in some manner, such as by injecting a delay into the code build or by preventing a particular task from completing.

While the code build is being prevented from completing, act 2520 includes causing the scanning tool to perform a penetrative test of the application. The scanning tool can be configured using the techniques described earlier. Furthermore, in some cases, the scanning tool is provided read-only access to the application hosted in the software development architecture. In some cases, the scanning tool performs a new penetrative test each time a new code build of the application is attempted. During a first instance when a new application is being developed, the scanning tool can perform a complete scan on the application. During later or subsequent scans, the scanning tool can scan only changes or deltas that have transpired since the last time the application was scanned. To identify such changes, the current version of the code can be compared against an earlier, archived version.

The penetrative test exercises the application in an attempt to identify vulnerabilities. For instance, the penetrative test can include an analysis of source code of the application, an analysis of the software development architecture, or even an analysis of security features associated with the application.

The scanning tool identifies, or rather generates, results of the penetrative test. For instance, one result of the penetrative test can include a listing of identified vulnerabilities that have been identified for the application. In some cases, the vulnerabilities included in the listing are ranked according to severity.

In some cases, the Red Teaming organization or group can attempt to identify techniques that, if followed, might resolve those vulnerabilities. In some embodiments, the penetrative test includes a determination as to whether the application complies with one or more preselected regulations, such as HIPPA, PCI, and so forth. In some cases, the regulations can be internally generated regulations, such as best coding practices. Here, the scanning tool can determine whether the coding structure complies with an enterprises established coding guidelines or principles.

In some implementations, the scanning tool includes a user interface having a particular visual layout. For instance, the visual layout can include a security status dashboard, such as that shown in FIGS. 20 and 21. Optionally, the dashboard can include an element for indicating a number of vulnerabilities that have been identified for the application. The dashboard can also include an element indicating a number of failed code builds that have occurred for the application. In some cases, the dashboard can include an element indicating a number of vulnerabilities that have been identified for the software development architecture. In some cases, the user interface or dashboard can further display a description for each vulnerability that has been identified for the application as a result of performing the penetrative test.

Based on a result of the penetrative test, act 2525 includes either permitting the code build to complete or, alternatively, terminating the code build prior to completion. If the number of vulnerabilities does not exceed a predetermined threshold number and/or if the number of critical issues or vulnerabilities does not exceed a particular threshold, then the scanning tool can permit the code build to complete. On the other hand, if the number of vulnerabilities and/or critical issues does exceed particular thresholds, then the scanning tool can prevent the code build from completing, such as by throwing an error or terminating a task.

Act 2530 involves generating an alert that includes the result of the penetrative test. The alert can be displayed in the user interfaces mentioned earlier, such as those described in FIGS. 20 and 21.

FIG. 26 shows another flowchart of an example method 2600 for again dynamically controlling whether a code build of an application finishes to completion or is terminated prior to completion. Initially, method 2600 includes an act (act 2605) of identifying that a scanning tool is operating as a plugin component in a software development architecture. This identification process can be performed by identifying the launch of the scanning tool, such as perhaps via an OS communication.

Act 2610 includes determining that an application, which is being hosted in the software development architecture, is entering a development state where a code build of the application executes to generate executable code for the application. After the code build for the application has started, act 2615 involves preventing the code build from completing generation of the executable code for the application at least until after a penetrative test of the application is performed by the scanning tool. In some cases, the scanning tool includes machine learning that facilitates the penetrative test and/or a review of the results of the penetrative test. Some embodiments cause the scanning tool to consult a public database to determine whether the application is subject to known threats that are included in the public database.

The application includes source code stored in a central repository. In some cases, the scanning tool performs the penetrative test on only source code that is checked-in at the central repository, which can be managed by the software development architecture.

While the code build is being prevented from completing the generation of the executable code for the application, act 2620 includes causing the scanning tool to perform the penetrative test of the application. Based on a result of the penetrative test, act 2625 includes either permitting the code build to complete the generation of the executable code or, alternatively, terminating the code build prior to completing the generation of the executable code.

In some cases, the code build is permitted to complete the generation of the executable code. As a consequence, the executable code is deployed and executed such that the application can then execute. Optionally, the scanning tool can be configured to identify when an attack is occurring against the executing application.

Accordingly, the disclosed embodiments beneficially introduce a scanning tool into the development pipeline. The scanning tool is at least triggered during a code build process included as a part of the development pipeline. The scanning tool is configured to delay the code build process for a period of time to enable a penetration test (performed by the scanning tool) to be performed. Based on the results of the test, the scanning tool can either allow the code build to complete or, alternatively, terminate the code build. If the termination occurs, then the scanning tool determined the application was too susceptible to misuse and exploitation. In some cases, the code build might initially be terminated. Later, however, the code build may be permitted to subsequently be built. Therefore, the disclosed embodiments significantly improve computer security by ensuring that applications are sufficiently safe before being deployed or released to the public.

Example Computer/Computer Systems

Figure 31:
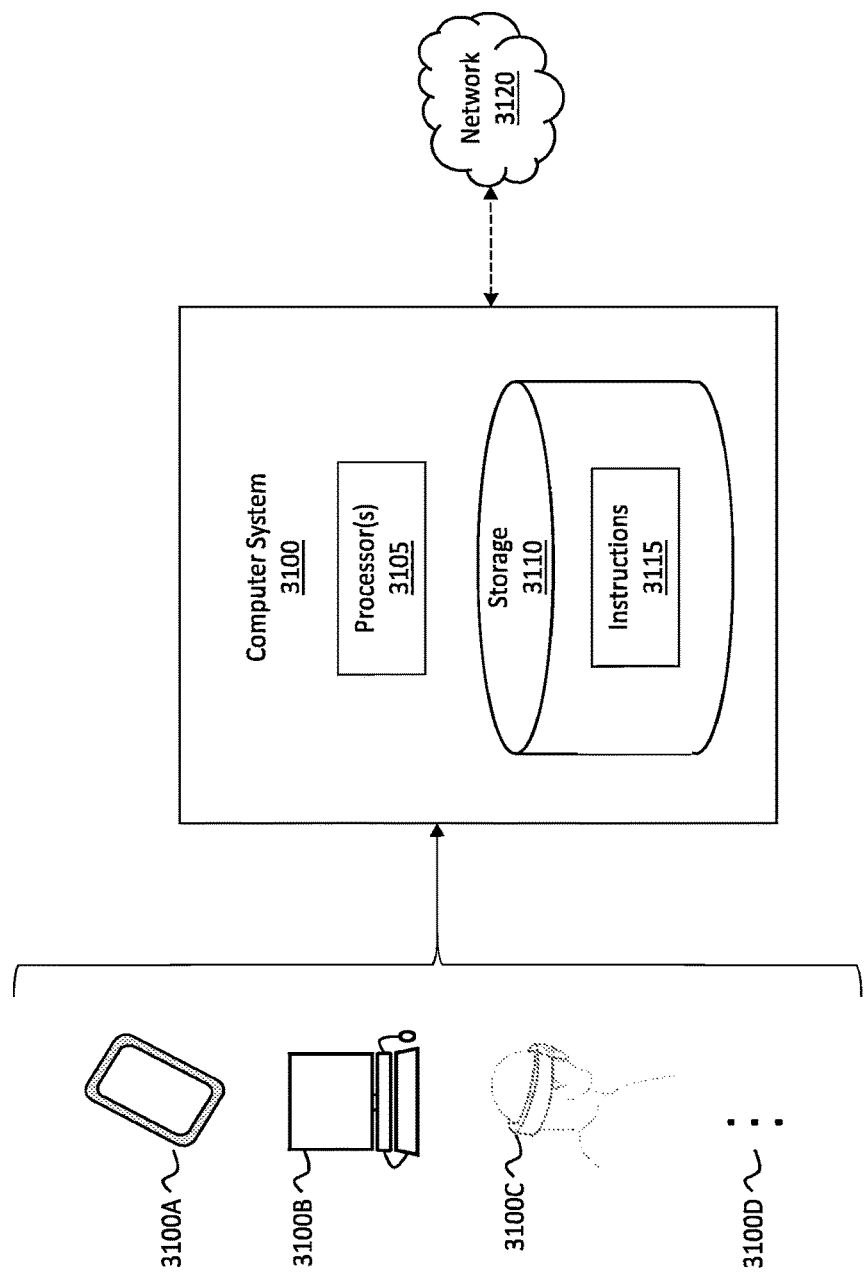
FIG. 31 illustrates an example computer system that can be configured to perform any of the disclosed operations.

Attention will now be directed to FIG. 31 which illustrates an example computer system 3100 that may include and/or be used to perform any of the operations described herein, including the disclosed methods. Computer system 3100 may take various different forms. For example, computer system 3100 may be embodied as a tablet 3100A, a desktop or a laptop 3100B, a wearable device 3100C, a mobile device, or any other type of standalone device, as generally represented by the ellipsis 3100D. Computer system 3100 may also be a distributed system that includes one or more connected computing components/devices that are in communication with computer system 3100.

In its most basic configuration, computer system 3100 includes various different components. FIG. 31 shows that computer system 3100 includes one or more processor(s) 3105 (aka a "hardware processing unit") and storage 3110.

Regarding the processor(s) 3105, it will be appreciated that the functionality described herein can be performed, at least in part, by one or more hardware logic components (e.g., the processor(s) 3105). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "engine," or "machine learning" can refer to hardware processing units or to software objects, routines, or methods that may be executed on computer system 3100. The different components, modules, engines, and services described herein may be implemented as objects or processors that execute on computer system 3100 (e.g. as separate threads).

Storage 3110 may be physical system memory, which may be volatile, non-volatile, or some combination of the two. The term "memory" may also be used herein to refer to non-volatile mass storage such as physical storage media. If computer system 3100 is distributed, the processing, memory, and/or storage capability may be distributed as well.

Storage 3110 is shown as including executable instructions 3115. The executable instructions 3115 represent instructions that are executable by the processor(s) 3105 of computer system 3100 to perform the disclosed operations, such as those described in the various methods.

The disclosed embodiments may comprise or utilize a special-purpose or general-purpose computer including computer hardware, such as, for example, one or more processors (such as processor(s) 3105) and system memory (such as storage 3110), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RANI, ROM, EEPROM, CD-ROM, solid state drives ("SSD") that are based on RANI, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 3100 may also be connected (via a wired or wireless connection) to external sensors (e.g., one or more remote cameras) or devices via a network 3120. For example, computer system 3100 can communicate with any number devices or cloud services to obtain or process data. In some cases, network 3120 may itself be a cloud network. Furthermore, computer system 3100 may also be connected through one or more wired or wireless networks 3120 to remote/separate computer systems(s) that are configured to perform any of the processing described with regard to computer system 3100.

A "network," like network 3120, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 3100 will include one or more communication channels that are used to communicate with the network 3120. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RANI and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically controlling whether a code build of an application finishes to completion or is terminated prior to completion, said method comprising:

accessing a scanning tool that is configured to scan a software development architecture;

determining that an application, which is hosted in the software development architecture, is entering a development state in which a code build of the application is to occur;

preventing the code build from completing;

while the code build is being prevented from completing, causing the scanning tool to scan the application, wherein the scanning tool additionally scans the software development architecture that is hosting the application such that both the application and the software development architecture are subjected to the scan during a time when the scanning tool is preventing the code build from completing;

based on a result of the scan, terminating the code build prior to completion; and generating an alert that includes the result of the scan.

2. The method of claim 1, wherein the scanning tool is further configured to scan for denial of service attacks.

3. The method of claim 1, wherein after the code build is initially terminated, the code build is subsequently permitted to complete.

4. The method of claim 1, wherein the scan includes an analysis of source code of the application.

5. The method of claim 1, wherein the scan includes an analysis of the software development architecture.

6. The method of claim 1, wherein the scan includes an analysis of security features associated with the application.

7. The method of claim 1, wherein the result of the scan includes a listing of identified vulnerabilities that have been identified for the application.

8. The method of claim 7, wherein the vulnerabilities included in the listing are ranked according to severity.

9. The method of claim 1, wherein the scanning tool has read-only access to the application hosted in the software development architecture.

10. The method of claim 1, wherein the scanning tool performs a new scan each time a new code build of the application is attempted.

11. A computer system that dynamically controls whether a code build of an application finishes to completion or is terminated prior to completion, said computer system comprising:

at least one processor; and at least one hardware storage device that stores instructions that are executable by the at least one processor to cause the computer system to:

access a scanning tool that is configured to scan a software development architecture;

determine that an application, which is hosted in the software development architecture, is entering a development state where a code build of the application executes to generate executable code for the application;

prevent the code build from completing generation of the executable code for the application at least until after a scan of the application is performed by the scanning tool;

while the code build is being prevented from completing the generation of the executable code for the application, cause the scanning tool to perform the scan of the application, wherein the scanning tool additionally scans the software development architecture that is hosting the application such that both the application and the software development architecture are subjected to the scan during a time when the scanning tool is preventing the code build from completing; and based on a result of the scan, terminate the code build and prevent generation of the executable code.

12. The computer system of claim 11, wherein the scan includes a determination as to whether the application complies with one or more preselected regulations.

13. The computer system of claim 11, wherein the scanning tool includes a user interface having a particular visual layout, and wherein the visual layout includes a security status dashboard comprising:

an element indicating a number of vulnerabilities that have been identified for the application;

an element indicating a number of failed code builds that have occurred for the application;

an element indicating a number of vulnerabilities that have been identified for the software development architecture.

14. The computer system of claim 13, wherein the user interface further displays a description for each vulnerability that has been identified for the application as a result of performing the scan.

15. The computer system of claim 11, wherein the code build is permitted to complete the generation of the executable code, wherein the executable code is deployed and executed such that the application is executing, and wherein the scanning tool identifies when an attack is occurring against the executing application.

16. The computer system of claim 11, wherein the scanning tool includes machine learning that facilitates the scan.

17. The computer system of claim 11, wherein the scanning tool consults a public database to determine whether the application is subject to known threats that are included in the public database.

18. The computer system of claim 11, wherein the application includes source code, and wherein the scanning tool performs the scan on only source code that is checked-in at a central repository, which is managed by the software development architecture.

19. A method for dynamically controlling whether a code build of an application finishes to completion or is terminated prior to completion, said method comprising:

determining that an application, which is being hosted in a software development architecture, is entering a development state in which a code build of the application is to occur;

after the code build for the application has started, using a scanning tool to prevent the code build from finishing a set of build tasks;

while the code build is being prevented from finishing the set of build tasks, causing the scanning tool to perform a scan of the application, wherein the scanning tool additionally scans the software development architecture that is hosting the application such that both the application and the software development architecture are subjected to the scan during a time when the scanning tool is preventing the code build from completing; and based on a result of the scan, terminating the code build prior to the set of build tasks finishing, wherein the result of the scan indicates that the scanning tool has identified at least a threshold number of vulnerabilities for the application.

20. The method of claim 19, wherein the set of build tasks includes pushing an update to a client device, and wherein the code build is terminated prior to pushing the update.

* * * * *